(12) United States Patent
Shenoy et al.

(10) Patent No.: US 11,958,692 B2
(45) Date of Patent: Apr. 16, 2024

(54) CONVEYOR ASSEMBLY AND METHOD OF USING THE SAME

(71) Applicant: Intelligrated Headquarters, LLC, Mason, OH (US)

(72) Inventors: Gowrish G. Shenoy, Bangalore (IN); Kalirajan Chelliah, Hosur (IN); Sakthivel Raj, Coimbatore (IN); Prashanth Sagar, Bangalore (IN); Karthikeyan Murugesan, Bangalore (IN)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

(21) Appl. No.: 17/811,452

(22) Filed: Jul. 8, 2022

(65) Prior Publication Data
US 2024/0010434 A1 Jan. 11, 2024

(51) Int. Cl.
*B65G 13/06* (2006.01)
*B65G 43/08* (2006.01)

(52) U.S. Cl.
CPC ............. *B65G 13/06* (2013.01); *B65G 43/08* (2013.01); *B65G 2203/041* (2013.01)

(58) Field of Classification Search
None
See application file for complete search history.

(56) References Cited

U.S. PATENT DOCUMENTS

| 4,013,161 | A | * | 3/1977 | Nelson | ................. | B65G 47/261 |
| | | | | | | 198/781.08 |
| 4,108,303 | A | | 8/1978 | Vogt et al. | | |
| 5,086,910 | A | | 2/1992 | Terpstra | | |
| 5,168,979 | A | * | 12/1992 | Iversen | ................. | B65G 47/261 |
| | | | | | | 198/781.08 |
| 8,028,817 | B2 | * | 10/2011 | Itoh | ..................... | B65G 47/261 |
| | | | | | | 198/460.1 |
| 9,309,058 | B2 | | 4/2016 | Maglaty | | |
| 10,160,607 | B2 | | 12/2018 | Danelski et al. | | |
| 2003/0089580 | A1 | | 5/2003 | Pfeiffer | | |

OTHER PUBLICATIONS

Extended European Search Report Mailed on Feb. 14, 2024 for EP Application No. 23177189, 10 page(s).

* cited by examiner

*Primary Examiner* — William R Harp
(74) *Attorney, Agent, or Firm* — Alston & Bird LLP

(57) ABSTRACT

Various embodiments are directed to a conveyor assembly and method of using the same. In various embodiments, a conveyor assembly may comprise a plurality of rollers defining a conveyor section configured for transporting one or more objects disposed thereon along a transportation path, wherein the plurality of rollers comprises a drive roller, the drive roller being selectively configurable between a first operating condition and a second operating condition; and a controller configured to generate one or more control signals to control the drive roller; wherein the conveyor section is selectively configurable between a single-zone configuration and a dual-zone configuration based on the configuration of the drive roller in one of the first operating condition and the second operating condition, the dual-zone configuration being defined by the drive roller selectively driving operation of a first conveyor zone and a second conveyor zone defined within the conveyor section independently of one another.

20 Claims, 13 Drawing Sheets

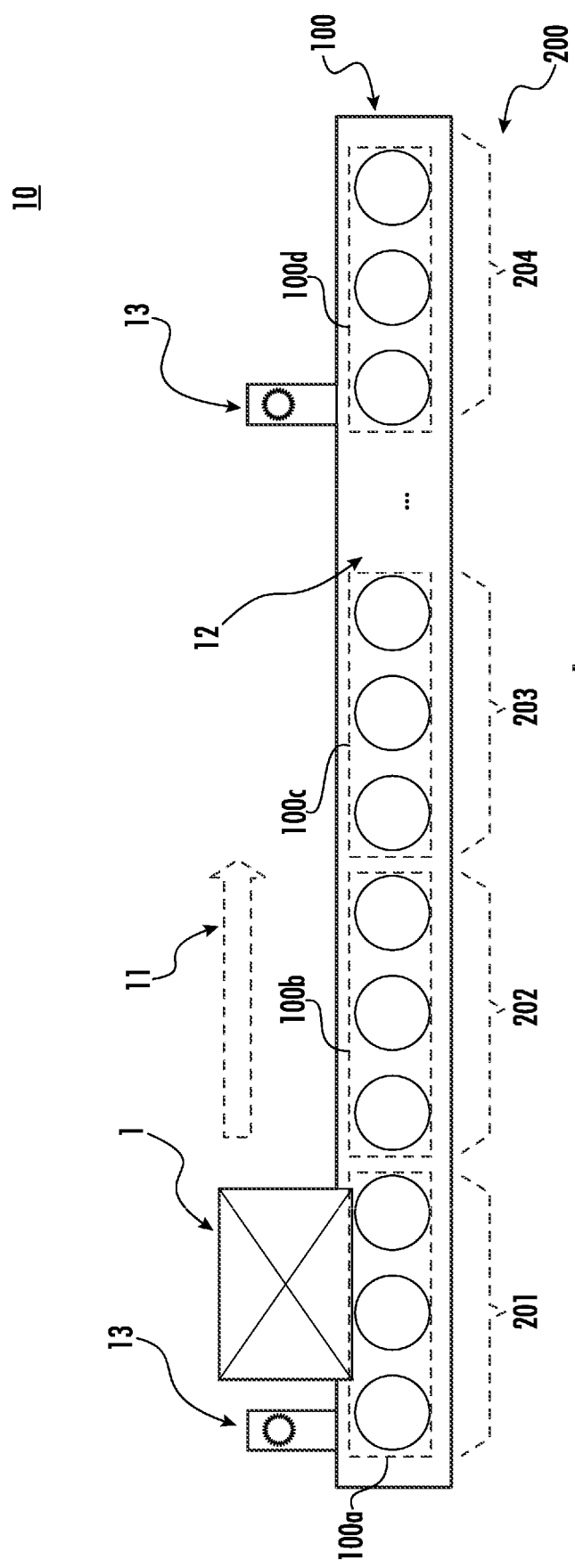

CONVEYOR ASSEMBLY AND METHOD OF USING THE SAME

FIELD OF THE INVENTION

Example embodiments of the present invention relates generally to a material handling system for handling items, and, more particularly, to motorized roller apparatuses for use with conveyor systems.

BACKGROUND

Conveyor systems and assemblies may be used in industrial manufacturing and packing applications, for example, to facilitate the transportation of a large number of objects to a desired destination within a factory or a warehouse. These conveyor systems and assemblies often utilize one or more motorized roller apparatuses to drive transportation of the objects along a transportation path defined by the conveyor assembly. Many motorized roller apparatuses and devices for conveyor assemblies are plagued by technical challenges and limitations. Through applied effort, ingenuity, and innovation, the problems identified herein have been solved by developing solutions that are included in embodiments of the present disclosure, many examples of which are described in detail herein.

BRIEF SUMMARY

Various embodiments are directed to a conveyor assembly and method of using the same. In various embodiments, a conveyor assembly may comprise a plurality of rollers defining a conveyor section configured for transporting one or more objects disposed thereon along a transportation path, wherein the plurality of rollers comprises a drive roller configured to drive respective rotations of each of the plurality of rollers, and wherein the drive roller is selectively configurable between a first operating condition and a second operating condition; and a controller configured to generate one or more control signals configured to control the drive roller; wherein the conveyor assembly is configured such that the conveyor section is selectively configurable between a single-zone configuration and a dual-zone configuration based at least in part on the configuration of the drive roller in one of the first operating condition and the second operating condition; and wherein the dual-zone configuration is defined by the drive roller being configured to selectively drive operation of a first conveyor zone and a second conveyor zone defined within the conveyor section independent of one another, wherein the first conveyor zone is defined by a first portion of the plurality of rollers and the second conveyor zone is defined by a second portion of the plurality of rollers.

In various embodiments, the single-zone configuration may be defined by the drive roller being configured to at least substantially simultaneously drive operation of a single conveyor zone within the conveyor section, wherein the single conveyor zone is defined by each of the plurality of rollers such that the single conveyor zone is defined by a full zone length; and wherein the dual-zone configuration is defined by the drive roller being configured to selectively drive operation of the first conveyor zone and the second conveyor zone defined within the conveyor section, the first and second conveyor zones each being defined by a respective reduced zone length that is at least substantially less than the full zone length of the single conveyor zone. In various embodiments, the conveyor assembly may further comprise an imaging device configured to capture object data associated with the one or more objects disposed upon the plurality of rollers, the imaging device being in communication; wherein the controller is configured to transmit one or more control signals to the drive roller based at least in part on the object data captured by the imaging device, wherein the one or more control signals are configured to cause the drive roller to be selectively configured according to one of the first operating condition and the second operating condition. In certain embodiments, the conveyor assembly may be configured such that the drive roller being configured according to the first operating condition causes the conveyor section to define the single-zone configuration and the drive roller being configured according to the second operating condition causes the conveyor section to define the dual-zone configuration.

In various embodiments, the conveyor section may be defined by the drive roller and a plurality of idler rollers operatively connected to the drive roller such that a rotation of each idler roller is based at least in part on one or more drive rotations of the drive roller, wherein the plurality of idler rollers comprises at least one leading idler roller and at least one trailing idler roller, the least one leading idler roller defining an upstream position along the transportation path relative to the drive roller and the least one trailing idler roller defining a downstream position along the transportation path relative to the drive roller. In certain embodiments, the single-zone configuration may be defined by the drive roller being configured to at least substantially simultaneously drive operation of a single conveyor zone within the conveyor section, wherein the single conveyor zone is defined by each of the plurality of rollers such that the single-zone configuration of the conveyor section is defined by the drive roller being configured to at least substantially simultaneously operate the least one leading idler roller and the least one trailing idler roller. In certain embodiments, the dual-zone configuration of the conveyor section may be defined by the drive roller being configured to operate the least one leading idler roller independently of the least one trailing idler roller such that the first conveyor zone is defined at least in part by the at least one leading idler rollers and the second conveyor zone is defined at least in part by the at least one trailing idler rollers. In certain embodiments, the drive roller may be configured such that selective operation of the first portion of the plurality of rollers defining the first conveyor zone is defined by a first rotation of the drive roller and selective operation of the second portion of the plurality of rollers defining the second conveyor zone is defined by a second rotation of the drive roller, wherein the first rotation and the second rotation are in in the same rotational direction relative to a central axis of the drive roller. Further, in certain embodiments, the drive motor of the drive roller may be operated to facilitate execution of both the first rotation and the second rotation.

In various embodiments, the drive roller may be a motor driven roller (MDR). In various embodiments, the one or more control signals generated by the controller may comprise a first control signal comprising a drive signal configured to cause one or more rotations of the drive roller, and a second control signal comprising a configuration signal configured to cause the drive roller to be selectively configured in one of the first operating condition and the second operating condition. In various embodiments, the drive roller may comprise one or more clutch-activated bearing element configured for engagement with a respective drive band to facilitate an operative connection between the drive roller and at least a portion of the plurality of rollers of the conveyor section; wherein the one or more clutch-activated bearing elements is selectively configurable between an engaged configuration and a disengaged configuration relative to a clutch element of the drive roller. In certain embodiments, the engaged configuration of a clutch-activated bearing element may be defined by the clutch-activated bearing element being engaged by the clutch element such that a rotational position of the clutch-activated bearing element is fixed relative to a drive roller housing and the clutch-activated bearing element is rotated with the drive roller housing during operation of the drive roller; and wherein the disengaged configuration of the clutch-activated bearing element is defined by the clutch-activated bearing element being disengaged from the clutch element such that the rotational position of the clutch-activated bearing element is at least substantially unaffected as the drive roller housing rotates relative to the clutch-activated bearing element during operation of the drive roller.

In various embodiments, the one or more clutch-activated bearing elements may comprise a first clutch-activated bearing element frictionally engaged with a first drive belt that is configured to operatively connect the drive roller to the first portion of the plurality of rollers, and a second clutch-activated bearing element frictionally engaged with a second drive belt that is configured to operatively connect the drive roller to the second portion of the plurality of rollers, wherein the first clutch-activated bearing element and the second clutch-activated bearing element are each independently configurable between respective engaged and disengaged configurations. In various embodiments, the single-zone configuration of the conveyor section may be defined by both the first clutch-activated bearing element and the second clutch-activated bearing element being selectively configured in an engaged configuration. In certain embodiments, the dual-zone configuration of the conveyor section may be defined by a first one of the first clutch-activated bearing element and the second clutch-activated bearing element being selectively configured in an engaged configuration and a remaining one of the first clutch-activated bearing element and the second clutch-activated bearing element being selectively configured in a disengaged configuration.

In various embodiments, the one or more control signals generated by the controller may correspond at least in part to object data associated with an object length of an object positioned along the transportation path. In certain embodiments, the conveyor assembly may be configured to selectively configure the drive roller in the first operating condition corresponding to the conveyor section being in the single-zone configuration based upon a determination that the object length associated with the object is greater than or equal to a predetermined length threshold. In certain embodiments, the conveyor assembly may be configured to selectively configure the drive roller in the second operating condition corresponding to the conveyor section being in the dual-zone configuration based upon a determination that the object length associated with the object is less than a predetermined length threshold.

Various embodiments are directed to a motorized drive roller for a conveyor apparatus, the drive roller comprising a first clutch-activated bearing element configured to frictionally engage a first drive belt to facilitate an operative connection between the drive roller and at least one leading idler roller of a plurality of idler rollers configured to be controlled based on an operation of the drive roller; a second clutch-activated bearing element configured to frictionally engage a second drive belt to facilitate an operative connection between the drive roller and at least one leading trailing roller of the plurality of idler rollers; wherein the drive roller is configured to is selectively configurable between a first operating condition corresponding to the plurality of idler rollers collectively defining a single-zone configuration wherein each of the plurality of idler rollers are at least substantially simultaneously controlled by the drive roller and a second operating condition corresponding to the plurality of idler rollers collectively defining a dual-zone configuration wherein the at least one leading idler roller defines a first conveyor zone and the at least one trailing idler roller defines a second conveyor zone, the first and second conveyor zones being selectively controlled by the drive roller independent of one another; and wherein the second operating condition is defined by the first clutch-activated bearing element being selectively configured in an engaged configuration and the second clutch-activated bearing element being selectively configured in a disengaged configuration.

BRIEF DESCRIPTION OF THE DRAWINGS

Reference will now be made to the accompanying drawings, which are not necessarily drawn to scale, and wherein:

FIG. 4 schematically illustrates a side cross-sectional view of an exemplary conveyor assembly according to various embodiments described herein;

DETAILED DESCRIPTION

Figure 1:
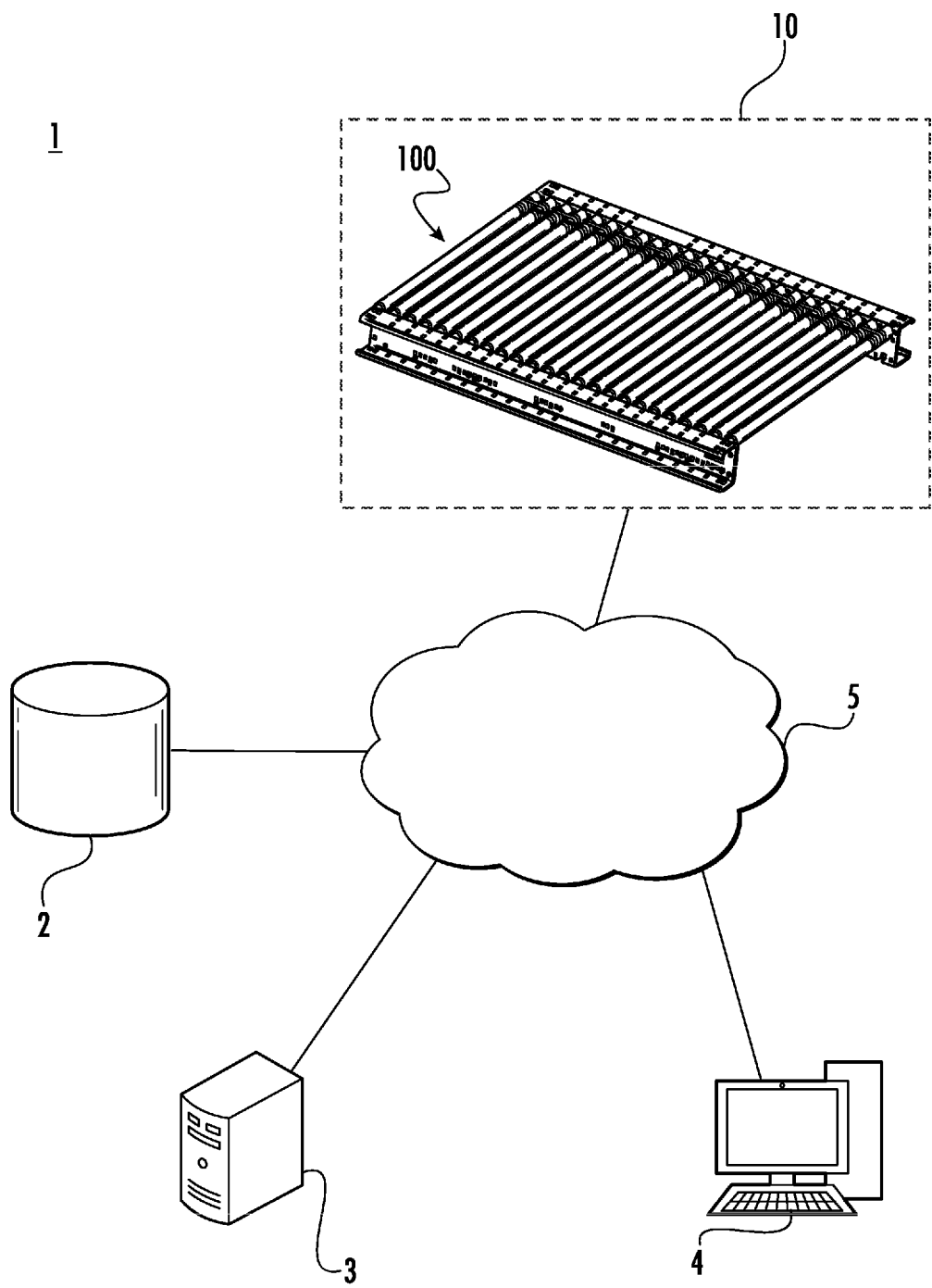
FIG. 1 illustrates an example of a system in accordance with various embodiments of the present disclosure.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

Generally, conveyor systems may be used in various industrial and commercial applications to facilitate the transport of objects or cargo. In particular, motor driven roller (MDR) conveyor assemblies, or conveyor assemblies whose mechanism of transport involves the rotation of a plurality of rollers, may be used over other conveyor systems (e.g., belt conveyor systems) due to finer control over object transportation. The finer control provided by a MDR conveyor assemblies may, for example, enable certain objects to be held at certain locations for processing tasks to be completed, while continuing to transport other objects within the MDR conveyor assemblies. That is, different objects within a MDR conveyor system may be transported independently and/or at different speeds, if desired, such as, for example, to provide a separation or buffer distance between objects, to queue or accumulate objects before a certain point, and/or to account for objects having different dimensional characteristics (e.g., different object lengths).

In various examples, a MDR conveyor system may include a sequence of zones that define regions of independent control of object transportation. For example each zone may be defined by a zone length that extends along a portion of a transportation path such that the transportation of an object travelling along the transportation path is driven by a motor drive roller controlling a particular zone as the object travels along the zone length of that particular zone. In some example MDR conveyor systems, a plurality of zones defined by a conveyor system may be individually operated in sequence to facilitate the continuous and/or consecutive transportation of an object throughout the plurality of conveyor zones. For example, a first zone may be controlled by a first MDR to transport the object along the zone length of the first zone and to an infeed position of a consecutively arranged second zone adjacent thereto, which may then be controlled by a second MDR to further transport the object along the second zone length of the second zone, and so forth. Upon the object being discharged from the first zone to the second zone, MDR conveyor systems may subsequently receive a second object at an infeed of the first zone and the transportation operation executed by the conveyor system may be restarted with respect to the second object to transport the second object throughout the plurality of conveyor zones. In such MDR conveyor systems, the maximum throughput of the conveyor assembly through a particular zone may be defined at least in part by the zone length thereof, as the transportation of objects defined by an object length that substantially less than the zone length of a particular zone creates an undesirable downtime wherein a subsequent object positioned at an infeed position of the conveyor zone must wait for the smaller object to travel the length of the zone and be discharged from the zone before the subsequent object can progress further along the transportation path. MDR conveyor systems defined by zones having rigidly defined zone lengths are plagued by inefficiencies that may be caused by a reduced conveyor capacity, thereby resulting in a conveyor system that is operated at a less than optimal throughput.

Accordingly, various embodiments of the present disclosure address technical challenges that relate to a conveyor assembly for transporting a plurality of objects having different object lengths along a transportation path. In various embodiments, an exemplary conveyor assembly may be configured to dynamically adjust the configuration of a conveyor section controlled by a drive roller between a single-zone configuration and a dual-zone configuration based at least in part on the detected object length of an object to be received by the conveyor section. The conveyor apparatus may comprise a motor driven roller (MDR) configured for driving operation of a plurality of idler rollers within a conveyor section and being selectively configurable between a first operating condition and a second operating condition to facilitate the selective configuration of the conveyor section between a single-zone configuration and a dual-zone configuration. For example, the conveyor assembly may capture object data (e.g., using an imaging device) to determine than an object to be received at a conveyor section has an object length that is less than a predetermined length threshold. The present invention includes a conveyor assembly configured to, upon determining that the object length of an object to be received by the conveyor section is less than a predetermined length threshold, selectively configure the MDR in a second operating condition wherein the MDR is configured to independently control operation of the leading idler rollers and the trailing idler rollers within the conveyor sections, thereby effectively defining a first conveyor zone and a second conveyor zone within the conveyor section controlled by the MDR, each of which are defined by a reduced zone length so as to enable a finer control of the transportation of the object along the transportation path. The conveyor assembly may utilize one or both of a plurality of independently configurable clutch-activated bearing elements of the drive roller to selectively configure the conveyor section between the single-zone configuration and the dual-zone configuration based on the determined object length of an object, thereby increasing the maximum object occupancy within a conveyor section at any given time and maximizing the throughput of a plurality of distinctly dimensioned objects being transported along the transportation path. For example, in various embodiments, the exemplary conveyor assembly may be configured to maximize throughput along a conveyor section by, upon determining that a first object has an object length (e.g., as defined in the direction of the transportation path) that is less than a predetermined length threshold, selectively reducing the zone length of one or more conveyor zones defined along the transportation path so as to minimize the wait time required before a second object can be fed into the conveyor section.

Referring now to FIG. 1, a schematic diagram depicting an example system 1 in accordance various embodiments of the present disclosure is provided. As depicted, the example system 1 includes a conveyor assembly 10 comprising one or more motorized conveyor rollers, one or more computing entities 3 (e.g., servers), one or more databases 2, one or more networks 5, one or more user computing entities 4, and/or the like. In various examples, the system 1 can operate to convey objects within a particular location or environment.

In various embodiments, the conveyor assembly 10 can be configured to transport objects within a particular location or environment utilizing one or more motorized conveyor rollers. In some embodiments, the conveyor assembly 10 includes one or more motorized conveyor rollers, the one or more computing entities 3, the one or more databases 2 and/or the one or more user computing entities 4 are in electronic communication with each other over the one or more networks 5 such that they can exchange data (e.g., receive and transmit data) with one another (e.g., periodically and/or in response to requests). Each of the components of the system 1 can be in communication with one another over the same or different wireless or wired networks 5 including, for example, a wired or wireless Personal Area Network (PAN), Local Area Network (LAN), Metropolitan Area Network (MAN), Wide Area Network (WAN), cellular network, and/or the like. While FIG. 1 illustrates certain system components as separate, standalone devices, the various embodiments are not limited to this particular architecture.

As depicted in FIG. 1, the example system 1 includes one or more computing entities 3. In general, the terms computing device, entity, device, system, and/or similar words used herein interchangeably can refer to, for example, one or more computers, computing devices, computing entities, desktop computers, mobile phones, tablets, phablets, notebooks, laptops, distributed systems, terminals, servers or server networks, blades, gateways, switches, processing devices, set-top boxes, relays, routers, network access points, base stations, the like, and/or any combination of devices adapted to perform the functions, operations, and/or processes described herein. Such functions, operations, and/or processes can include, for example, transmitting, receiving, operating on, processing, displaying, storing, determining, generating/creating, monitoring, evaluating, comparing, and/or similar terms used herein interchangeably. In one embodiment, these functions, operations, and/or processes can be performed on data, content, information, and/or similar terms used herein interchangeably.

In some examples, the computing entity 3 can also include one or more network and/or communications interfaces for communicating with various computing entities, such as by communicating data, content, information, and/or similar terms used herein interchangeably that can be transmitted, received, operated on, processed, displayed, stored, and/or the like.

In one embodiment, the computing entity 3 can further include or be in communication with non-volatile media (also referred to as non-volatile storage, memory, memory storage, memory circuitry and/or similar terms used herein interchangeably). In one embodiment, the non-volatile storage or memory can include one or more non-volatile storage or memory media as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media can store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably can refer to a structured collection of records or information/data that is stored in a computer-readable storage medium, such as via a relational database, hierarchical database, and/or network database.

In one embodiment, the computing entity 3 can further include or be in communication with volatile media (also referred to as volatile storage, memory, memory storage, memory circuitry and/or similar terms used herein interchangeably). In one embodiment, the volatile storage or memory can also include one or more volatile storage or memory media as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media can be used to store at least portions of the databases, database instances, database management system entities, data, applications, programs, program modules, scripts, source code, object code, byte code, compiled code, interpreted code, machine code, executable instructions, and/or the like being executed by, for example, the processing element. Thus, the databases, database instances, database management system entities, data, applications, programs, program modules, scripts, source code, object code, byte code, compiled code, interpreted code, machine code, executable instructions, and/or the like can be used to control certain aspects of the operation of the computing entity 3 with the assistance of the processing element and the operating system.

As indicated, in one embodiment, the computing entity 3 can also include one or more network and/or communications interfaces for communicating with various computing entities, such as by communicating data, content, information, and/or similar terms used herein interchangeably that can be transmitted, received, operated on, processed, displayed, stored, and/or the like. Such communication can be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, computing entity 3 can be configured to communicate via wireless external communication networks using any of a variety of protocols, such as embedded sim (eSIM), remote sim provisioning (RSP), general packet radio service (GPRS), Universal Mobile Telecommunications System (UMTS), Code Division Multiple Access 200 (CDMA200), CDMA200 1×(1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), IR protocols, NFC protocols, RFID protocols, IR protocols, ZigBee protocols, Z-Wave protocols, 6LoWPAN protocols, Wibree, Bluetooth protocols, wireless universal serial bus (USB) protocols, and/or any other wireless protocol. The computing entity 3 can use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the computing entity's 3 components can be located remotely from other computing entity 3 components, such as in a distributed system. Furthermore, one or more of the components can be aggregated and additional components performing functions described herein can be included in the computing entity 3. Thus, the computing entity 3 can be adapted to accommodate a variety of needs and circumstances, such as including various components described with regard to a mobile application executing on the user computing entity 4, including various input/output interfaces.

As depicted in FIG. 1, the system 1 includes a user computing entity 4. In various embodiments, the user computing entity 4 can be or include one or more mobile devices, wearable computing devices, and/or the like. An example user computing entity 4 can include an antenna, a transmitter (e.g., radio), a receiver (e.g., radio), and a processing element that provides signals to and receives signals from the transmitter and receiver, respectively. The signals provided to and received from the transmitter and the receiver, respectively, can include signaling information/data in accordance with an air interface standard of applicable wireless systems to communicate with various devices, such as a computing entity (e.g., central server), another user computing entity 4, and/or the like. In an example embodiment, the transmitter and/or receiver are configured to communicate via one or more SRC protocols. For example, the transmitter and/or receiver can be configured to transmit and/or receive information/data, transmissions, and/or the like of at least one of Bluetooth protocols, low energy Bluetooth protocols, NFC protocols, RFID protocols, IR protocols, Wi-Fi protocols, ZigBee protocols, Z-Wave protocols, 6LoWPAN protocols, and/or other short range communication protocol. In various embodiments, the antenna, transmitter, and receiver can be configured to communicate via one or more long range protocols, such as GPRS, UMTS, CDMA200, 1×RTT, WCDMA, GSM, EDGE, TD-SCDMA, LTE, E-UTRAN, EVDO, HSPA, HSDPA, Wi-Fi, Wi-Fi Direct, WiMAX, and/or the like. The user computing entity 4 can also include one or more network and/or communications interfaces for communicating with various computing entities, such as by communicating data, content, information, and/or similar terms used herein interchangeably that can be transmitted, received, operated on, processed, displayed, stored, and/or the like. In this regard, the user computing entity 4 can be capable of operating with one or more air interface standards, communication protocols, modulation types, and access types. More particularly, the user computing entity 4 can operate in accordance with any of a number of wireless communication standards and protocols. In a particular embodiment, the user computing entity 4 can operate in accordance with multiple wireless communication standards and protocols, such as GPRS, UMTS, CDMA200, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 4 can communicate with various other devices using concepts such as Unstructured Supplementary Service information/data (US SD), Short Message Service (SMS), Multimedia Messaging Service (MMS), Dual-Tone Multi-Frequency Signaling (DTMF), and/or Subscriber Identity Module Dialer (SIM dialer). The user computing entity 4 can also download changes, add-ons, and updates, for instance, to its firmware, software (e.g., including executable instructions, applications, program modules), and operating system.

According to one embodiment, the user computing entity 4 can include location determining aspects, devices, modules, functionalities, and/or similar words used herein interchangeably to acquire location information/data regularly, continuously, or in response to certain triggers.

The user computing entity 4 can include a user interface device comprising one or more user input/output interfaces (e.g., a display and/or speaker/speaker driver coupled to a processing element and a touch interface, keyboard, mouse, and/or microphone coupled to a processing element). For example, the user interface can be configured to provide a mobile application, browser, interactive user interface, dashboard, webpage, and/or similar words used herein interchangeably executing on and/or accessible via the user computing entity 4 to cause display or audible presentation of information/data and for user interaction therewith via one or more user input interfaces. Moreover, the user interface can include or be in communication with any of a number of devices allowing the user computing entity 4 to receive information/data, such as a keypad (hard or soft), a touch display, voice/speech or motion interfaces, scanners, readers, or other input device. In embodiments including a keypad, the keypad can include (or cause display of) the conventional numeric (0-9) and related keys (#, *), and other keys used for operating the user computing entity 4 and can include a full set of alphabetic keys or set of keys that can be activated to provide a full set of alphanumeric keys. In addition to providing input, the user input interface can be used, for example, to activate or deactivate certain functions, such as screen savers and/or sleep modes. Through such inputs the user computing entity 4 can capture, collect, store information/data, user interaction/input, and/or the like.

The user computing entity 4 can also include volatile storage or memory and/or non-volatile storage or memory, which can be embedded and/or can be removable. For example, the non-volatile memory can be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory can be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, information/data, applications, programs, program modules, scripts, source code, object code, byte code, compiled code, interpreted code, machine code, executable instructions, and/or the like to implement the functions of the user computing entity 4.

As depicted in FIG. 1, any two or more of the illustrative components of the system 1 of FIG. 1 can be configured to communicate with one another via one or more networks 5. The networks 5 can include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 5 can have any suitable communication range associated therewith and can include, for example, global networks (e.g., the Internet), MANs, WANs, LANs, or PANs. In addition, the networks 5 can include any type of medium over which network traffic can be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

While FIG. 1 provides an example system 1, it is noted that the scope of the present disclosure is not limited to the example shown in FIG. 1. In some examples, the system 1 can include one or more additional and/or alternative elements, and/or can be different from that illustrated in FIG. 1.

Figure 2:
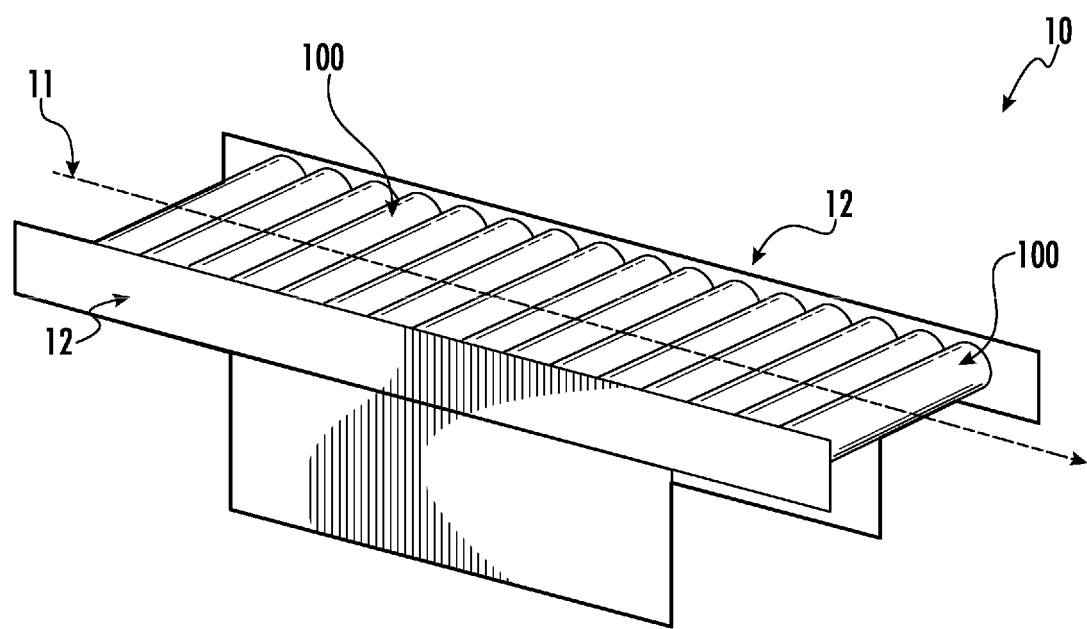
FIG. 2 illustrates a perspective view of an exemplary conveyor assembly according to various embodiments described herein.

FIG. 2 illustrates a perspective view of an example MDR conveyor assembly 10 that is configured to transport an object along a transportation path 11. The transportation path 11 generally defines a path through which an object may be transported from an infeed point to a discharge point. That is, in various examples, the transportation path 11 may extend from an infeed point at one end to a discharge point at another end. The infeed point may refer to a location at which the MDR conveyor assembly 10 receives objects for transportation. For example, an operator (e.g., human, manually operated, autonomous) may place an object on an upper surface of the MDR conveyor assembly 10 at an infeed point to allow for the object to be transported via the MDR conveyor assembly 10 to a discharge point through the transportation path 11. As another example, the infeed point may be positioned at and/or substantially near a discharge point of a preceding conveyor system, such that objects transported to the infeed point by the preceding conveyor system can be directly transported further to the discharge point of the MDR conveyor assembly 10 through the transportation path 11.

In various examples, the transportation path 11 may be at least substantially linear; that is, the MDR conveyor assembly 10 is configured to directly transport objects in a substantially straight path from an infeed point to a discharge point. In other various examples, the transportation path 11 may be non-linear and may include various turns, curves, diverting points, intersections, and/or the like. For instance, the MDR conveyor assembly 10 may be configured to have a non-linear transportation path due to physical and/or environmental constraints, such as various obstacles and infrastructure within a warehouse. Similarly, the MDR conveyor assembly 10 may be configured to have a non-linear transportation path such that objects may be transported near and past various environmental points, for example, where operator stations may be positioned to perform various processing tasks on the transported objects. It will be understood, however, that transportation of objects near and past various environmental points is not limited to MDR conveyor assemblies 10 with non-linear transportation paths, and MDR conveyor assemblies 10 with linear transportation paths may similar be configured to transport objects near and past various environmental points.

In various examples, the transportation path 11 may have verticality, and the MDR conveyor assembly 10 is configured to transport an object through different elevations. Thus, in addition or alternative to horizontal variations (e.g., in a x-y plane), the transportation path 11 may include vertical variations (e.g., in a z plane).

In some example instances, the MDR conveyor assembly 10 is configured to be capable of reversing the transportation path 11 along at least a portion of a conveying surface defined by the assembly 10. In doing so, the MDR conveyor assembly 10 may then transport objects from the previous discharge point to the previous infeed point. Similarly, a MDR conveyor assembly 10 having various intersections and/or diverting points may include multiple transportation paths 11 that extend through different segments of the MDR conveyor assembly 10 connected at said intersections and/or diverting points. In various example embodiments, the MDR conveyor assembly 10 is configured to transport different objects along different transportation paths 11 through various intersections and/or diverting points, such as for sorting tasks. Thus, while FIG. 2 illustrates one transportation path 11 for the MDR conveyor assembly 10, it will be understood that a MDR conveyor assembly 10 may be configured for any number of transportation paths 11 that may be linear and/or non-linear.

As illustrated, the MDR conveyor assembly 10 comprises a plurality of rollers 100 positioned along the transportation path 11. As described herein, in various embodiments, an exemplary roller 100 may be substantially cylindrically-shaped, and a roller may include a central rotational axis, a length along said axis, and a radius from the central rotational axis. An outer cylindrical surface of a roller 100 is configured to interface with an object disposed on the MDR conveyor assembly 10, or tangentially above the roller 100, and to translate the object in the transportation path 11 through rotation of the roller 100 about its central rotational axis. In some examples, the roller 100 is configured to interface and translate objects using a coating or a material on the outer cylindrical surface that is configured with a high friction coefficient.

Specifically, the plurality of rollers 100 of the MDR conveyor assembly 10 are positioned along the transportation path 11 such that the central rotational axis of each roller 100 is at least substantially perpendicular to the transportation path. Understood otherwise, the transportation path 11 of a MDR conveyor assembly 10 may be defined as a path (e.g., linear, non-linear) that is at least substantially perpendicular to the central rotational axes of the plurality of rollers 100 of the MDR conveyor assembly 10.

The plurality of rollers 100 of the MDR conveyor assembly 10 may be positioned between at least two sidewalls 12 that generally define a roller housing. Each roller 100 may be secured a sidewall 12 at each respective end such that translational movement of each roller 100 in significantly restricted. Thus, each roller 100 may be limited due only rotational movement about respective central rotational axes, as each roller 100 is secured to and between the at least two sidewalls 12. A roller 100 may be fixedly secured between the at least two sidewalls 12 at either end of its central rotational axis. In some examples, a roller 100 comprises an axle, rod, and/or the like defining its central rotational axis, and said axle, rod, and/or the like is secured to the at least two sidewalls 12. In various embodiments, the at least two sidewalls 12 and the lengths of the plurality of rollers 100 (e.g., that span between the at least two sidewalls 12) are configured based at least in part on a width of the objects to be transported by the MDR conveyor assembly 10. For instance, a MDR conveyor assembly 10 to be used for transporting parcels limited to a maximum width and/or dimension, the at least two sidewalls 12 and the lengths of the plurality of rollers 100 may be at least greater than said maximum width and/or dimension. With the plurality of rollers 100 being positioned between the sidewalls 12, it may be appreciated that the sidewalls 12 extend at least substantially parallel with the transportation path 11.

Figure 3:
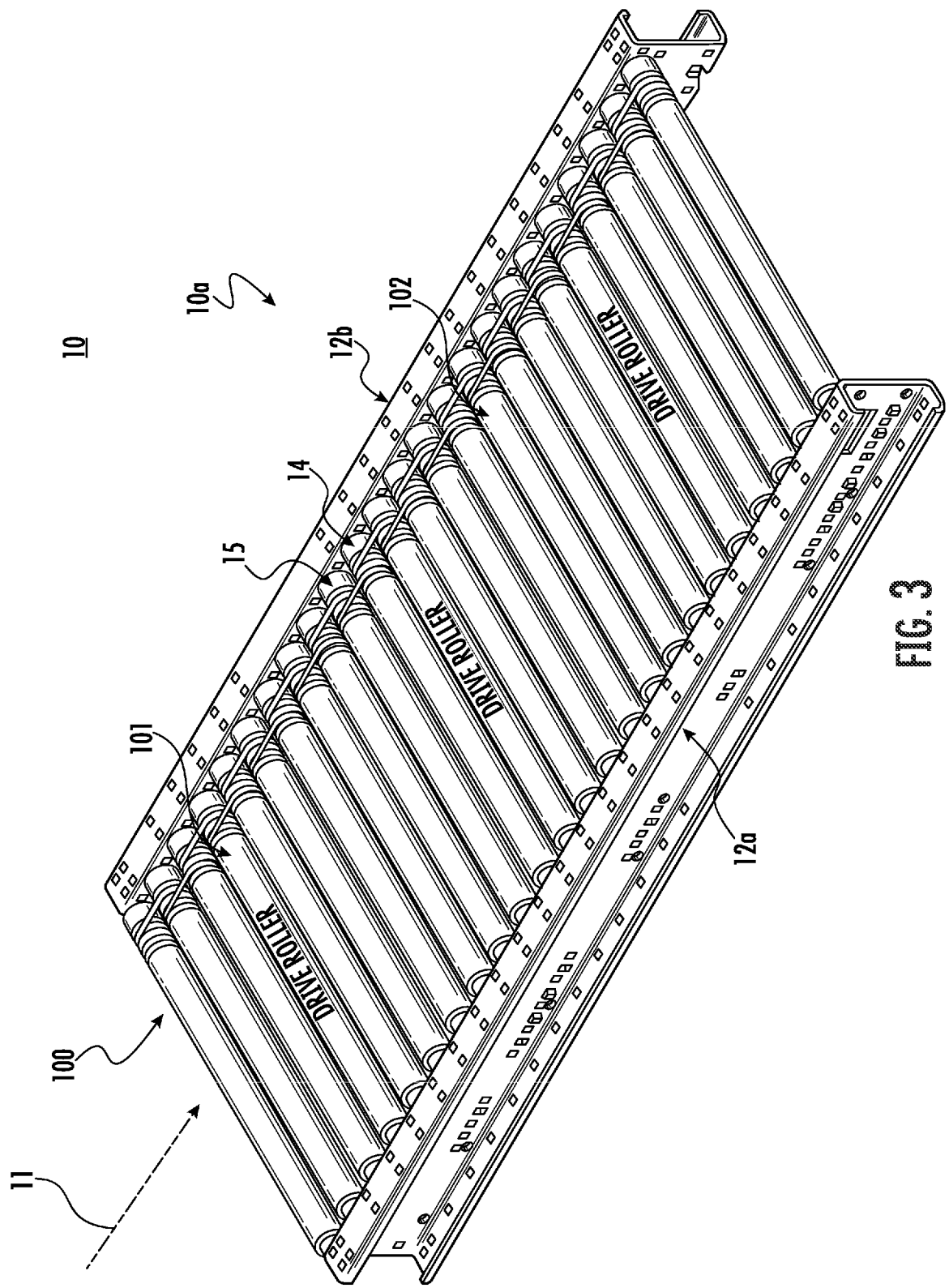
FIG. 3 a perspective view of a conveyor apparatus of an exemplary conveyor assembly according to various embodiments described herein.

In various embodiments, the plurality of rollers 100 of an exemplary conveyor assembly 10 may comprise at least one idler roller and at least one drive roller (e.g., a motor driven idler roller (MDR)) operatively engaged with the at least one idler roller such that drive roller may be used to cause rotation (e.g., operation) of the at least one idler roller to facilitate control the idler roller based at least in part on the at least one idler roller exhibiting a corresponding to that of the drive roller operatively engaged therewith. As an illustrative example, FIG. 3 illustrates a perspective view of an example conveyor apparatus of a conveyor assembly with a plurality of rollers including both motorized drive rollers and non-motorized idler rollers in accordance with various embodiments of the present disclosure. In some embodiments, the example portion of a conveyor apparatus 10a may define a particular section or conveyor zone of the conveyor assembly 10.

In various embodiments, an exemplary conveyor apparatus 10 may include a conveyor apparatus 10a comprising a plurality of rollers 100 defining a conveyor section configured for transporting one or more objects disposed thereon along a transportation path 11. As depicted in FIG. 3, the plurality of rollers 100 may comprise at least one motorized conveyor rollers, e.g., drive roller 101, and one or more non-motorized conveyor rollers, e.g., idler roller 102. In the embodiment depicted in FIG. 3, the example conveyor assembly 10 further comprises at least a first conveyor sidewall 12a and a second conveyor sidewall 12b. As depicted in FIG. 3, the plurality of motorized conveyor rollers and non-motorized conveyor rollers (e.g., drive roller 101 and idler roller 102) may be mechanically/operatively coupled to the first and second conveyor sidewalls 12a, 12b. In some embodiments, the first conveyor sidewall 12a and a second conveyor sidewall 12b may include one or more sets of apertures configured to receive the plurality of motorized conveyor rollers and non-motorized conveyor rollers (e.g., drive roller 101 and idler roller 102).

In some embodiments, as depicted in FIG. 3, a non-motorized conveyor roller (e.g., non-motorized conveyor roller 102) of the plurality of rollers 100 may be and/or comprise an idler roller or a driven roller. A motorized conveyor roller (e.g., motorized conveyor roller 101) may be and/or comprise a drive roller, such as, for example, a motor driven roller (MDR), as described herein. In various embodiments, a drive roller 101 may be configured to drive at least one idler roller 102 of the plurality of rollers 100. For example, drive roller 101 may be configured to drive at least one idler roller 102 operatively engaged therewith via one or more drive bands 14 engaged with the drive roller 101 and one or more of the at least one idler roller 102. In various embodiments, a drive band 14 may comprise an O-drive band configured to facilitate an operative engagement between a drive roller 101 and at least one idler roller 102 to enable the idler roller 102 to be driven by a rotation of the drive roller 101. As depicted in FIG. 3, in various embodiments, one or more drive rollers (e.g., drive roller 101) and at least one idler roller (e.g., idler roller 102) may be connected to each other through a series of drive bands 14 in order to drive the idler roller 102 (e.g., in response to a rotation/operation of the one or more drive roller 101). As further depicted, in various embodiments, a drive bands 14 may be reeved around a tracking ring 15 provided on a drive roller and/or an idler roller. For example, a tracking ring 15 may operate to ensure that a drive band 14 engaged therewith does not slip out of the roller defining the tracking ring 15 (e.g., the drive roller 101 and/or the idler roller 102) when the roller is operated (e.g., rotated) at full speed. Further, a drive band 14 may be connected to idler pulleys provided on/attached to either the first or the second conveyor sidewall 12a, 12b of the conveyor assembly 10 to maintain a target tension between the drive band 14 and one or more of the plurality of rollers 100 (e.g., a drive roller 101 and/or an idler roller 102) with which the band 14 is engaged.

In various embodiments, one or more motors of a conveyor assembly 10 (e.g., a motor assembly defined within an internal roller portion of an exemplary driver motor 101) may be unidirectional to facilitate a rotation of the rollers 100 in one of a clockwise or a counter-clockwise rotational direction. Further, one or more motors of an exemplary conveyor assembly 10 may be operated to apply rotation of the plurality of rollers 100 in a consistent direction, such that the plurality of rollers 100 of the conveyor assembly 10 may either all rotate clockwise or rotate counter-clockwise. Further still, in various embodiments, the conveyor assembly 10 may include bidirectional motors. Using bidirectional motors, the rotation of the plurality of rollers 100 may be reversed (e.g., from clockwise to counter-clockwise, and vice versa), also causing reversal of the transportation path 11.

While FIG. 3 depicts an example conveyor apparatus 10a of an exemplary conveyor assembly 10 according to various embodiments described herein, it is noted that the scope of the present disclosure is not limited to the example shown in FIG. 3. An example conveyor apparatus 10a of an exemplary conveyor assembly 10 in accordance with the present disclosure may comprise one or more additional and/or alternative elements, and/or may be different from that illustrated in FIG. 3.

In various embodiments, at least a portion of the plurality of rollers 100 of an exemplary conveyor assembly 1 may define a conveyor section configured for transporting one or more objects disposed upon one or more of the plurality of rollers 100 along a corresponding portion of a transportation path 11. In various embodiments, for example, a conveyor section defined by a plurality of rollers 100 of an exemplary conveyor assembly 10 may include one or more conveyor zones defined within the conveyor section along the transportation path 11. For example, FIG. 4 illustrates a side cross-sectional view of an exemplary conveyor assembly 10 having a plurality of conveyor zones 200 defined sequentially (e.g., serially and/or consecutively) along the transportation path 11. In particular, FIG. 4 illustrates an object 1 that may be transported along the transportation path 11 through the rotation of a plurality of rollers 100, and as illustrated, the object 1 tangentially interfaces with the plurality of rollers 100. Specifically, the object 1 interfaces with the plurality of rollers 100 by resting above the plurality of rollers 100.

It should be understood that, while FIG. 4 illustrates a transportation path 11 that is parallel with the cross-sectional view, various example conveyor assemblies 10 may be configured with transportation paths 11 that are non-linear and that may include any number of turns, curves, diverting points, intersections, and/or the like. By extension, the plurality of rollers 100 of such conveyor assemblies 10 may not necessarily be oriented to be parallel with each and every other roller of the plurality 100; that is, the plurality of rollers 100 may be positioned at varying angles (although not explicitly illustrated) relative to each other to facilitate any transportation path 11 (e.g., a nonlinear transportation direction).

As shown in the cross-sectional view of FIG. 4, the plurality of rollers 100 defining a conveyor section may be positioned with a separation distance between each roller 100 in order to facilitate rotation of each roller 100 and in order to prevent contact between the rollers 100. In some embodiments, the separation distance between each roller 100 is at least substantially constant or uniform throughout the plurality of rollers 100. The separation distance between each roller 100 may preferably be less than a length of prospective objects to be transported by the conveyor assembly 10 such that an object 1 tangentially interfaces with more than one roller 100 while being transported by the conveyor assembly 10.

As described herein, a conveyor zone of the conveyor assembly 10 may refer to a region or length of the transportation path 11 (e.g., along a conveyor apparatus defined by a plurality of rollers) within which operation of the conveyor assembly 10 can be independently controlled. For instance, the plurality of rollers 100 of an exemplary conveyor assembly 10 may include a first set of rollers 100a positioned within a first zone 201. As described herein, the first set of rollers 100a may be operated to rotate at a time and/or at a rotational speed that is different than the time and/or the rotational speed defining the operation of one or more other sets of rollers (e.g., a second set of rollers 100b, a third set of rollers 100c, a fourth set of rollers 100d) positioned within another conveyor zone (e.g., a second conveyor zone 202, a third conveyor zone 203, a further conveyor zone 204) in order to accomplish various transportation criteria, directives, objectives, and/or the like (e.g., creating a buffer distance between a line of objects 1, accumulating a number of objects at a certain location for a processing task, and/or the like). Accordingly, in various example embodiments, each conveyor zone 200 may be associated with at least one motor, such that each conveyor zone 200 can be controlled at one or more particular instances and/or at a rotational speed by at least one corresponding motor. For example, in various embodiments, each conveyor zone 200 defined by the conveyor assembly 10 (e.g., within a conveyor section) may include at least one drive roller, and at least one idler roller (e.g., a leading idler roller positioned upstream from the drive roller and a trailing roller positioned downstream from the drive roller).

As described, in various embodiments, a conveyor zone 200 may be defined along the transportation path 11 to include a plurality of rollers 100. For instance, in the exemplary embodiment illustrated in FIG. 4, each of the illustrated conveyor zones 200 includes three rollers 100. However, it will be understood that, in other non-limiting examples, different zones may have different numbers of rollers 100. As discussed, the conveyor assembly 10 may be configured such that the portion of the plurality of rollers 100 that are associated with, belong to, and/or are positioned within a conveyor zone 200 may be operated to rotate the same rotational speed and at substantially the same time. In various embodiments, each conveyor zone 200 may include at least one drive roller that is operated (e.g., rotated) by a motor associated therewith and configured to cause that other idler rollers that are operatively engaged therewith so as to be defined within the same conveyor zone 200 to "passively" rotate (e.g., via banding, ties, connections, and/or the like). Thus, generally, each conveyor zone 200 may be associated with an at least substantially simultaneous operation (e.g., a respective rotation of each of the plurality of rollers within the conveyor zone at substantially the same time) and/or a common rotational speed, which may be selectively operated and/or controlled by one or more components of the conveyor assembly 10 that are in electronic communication with the motor of the drive motor (e.g., a controller).

Figure 5A:
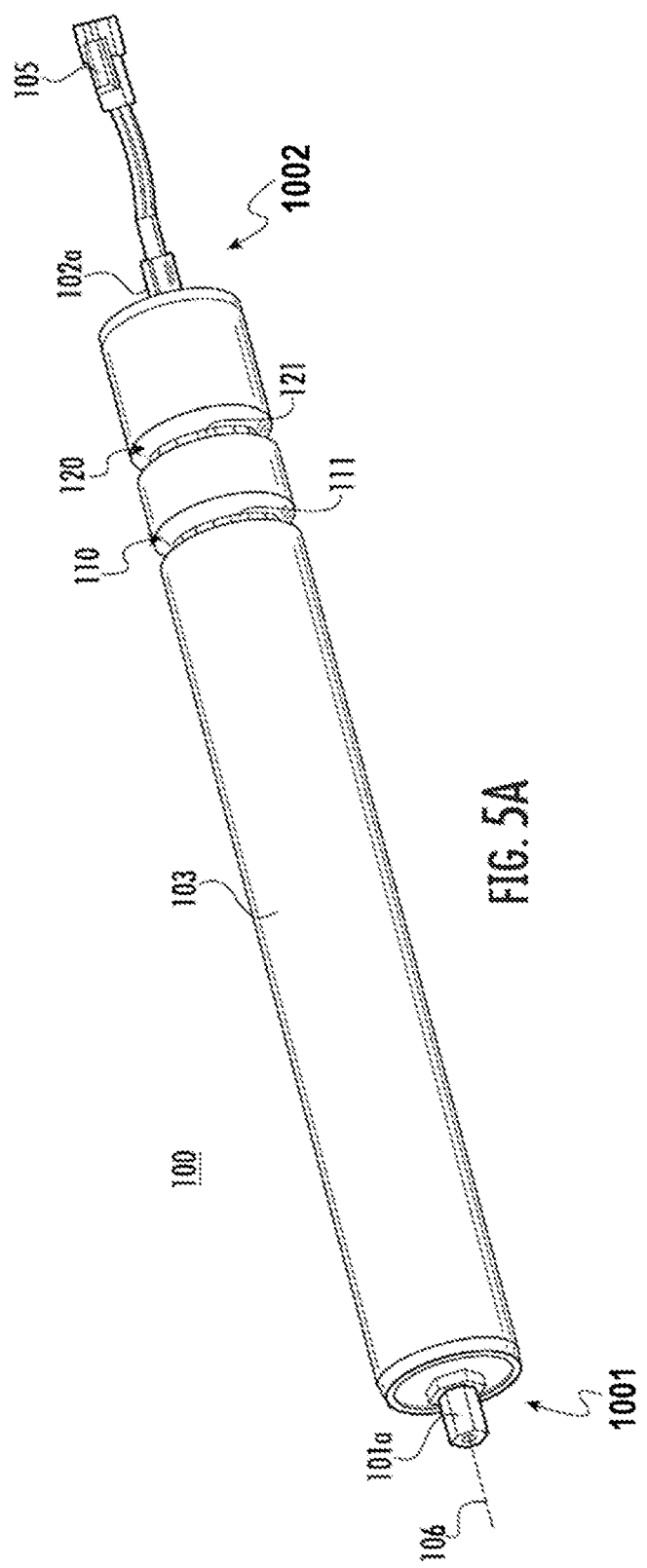
FIGS. 5A and 5B illustrate a perspective view and a cross-sectional view, respectively, of an exemplary drive roller according to example embodiments described herein.
Figure 5B:
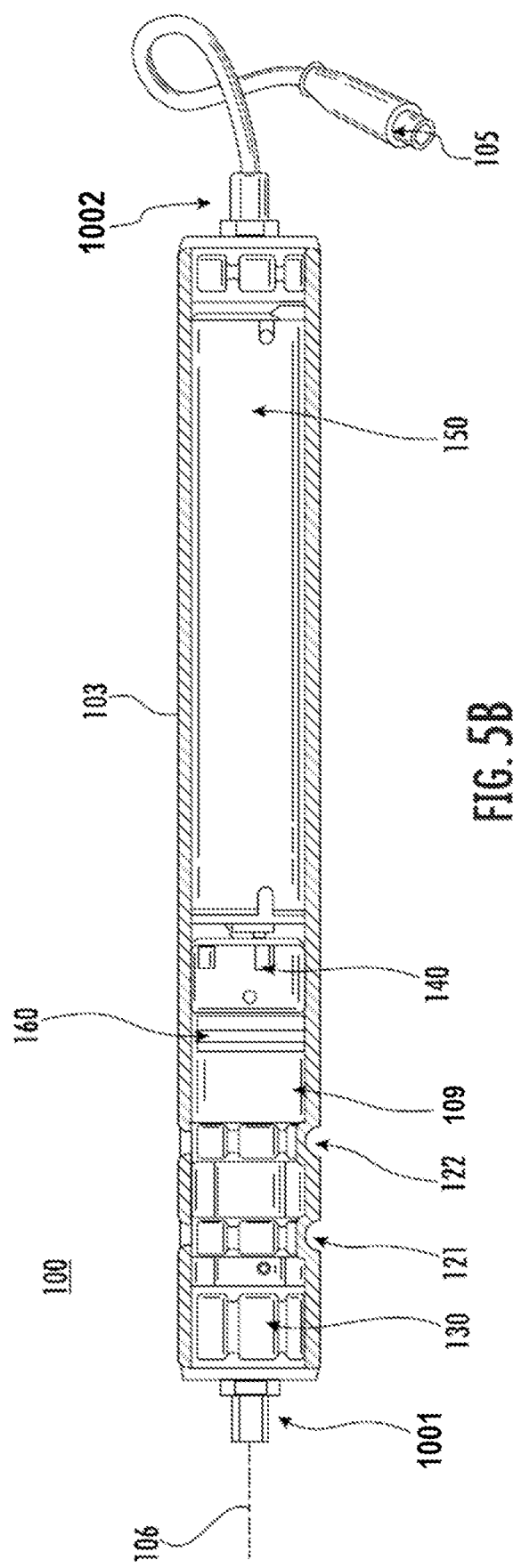

FIGS. 5A and 5B illustrate a perspective view and a cross-sectional view, respectively, of an exemplary drive roller according to example embodiments described herein. In particular, FIG. 5A illustrates a perspective view of an exemplary drive roller 100 comprising a motor driven roller (MDR) configured for driving operation of a plurality of idler rollers within a conveyor section and being selectively configurable between a first operating condition and a second operating condition to facilitate the selective configuration of the conveyor section between a single-zone configuration and a dual-zone configuration. For example, as described herein, the exemplary drive roller 101 may be configured between the first operating condition and the second operating condition based at least in part on a configuration of one or more clutch-activated bearing elements of the drive roller 101 that are each configured for selective engagement with a respective drive band operatively engaged with a distinct portion of the plurality of rollers defining the conveyor section.

As described herein, in various embodiments, the example drive roller 101 may be part of a conveyor assembly/conveyor system (e.g., the conveyor section of the conveyor apparatus described above in connection with FIG. 2) and may be configured to drive one or more idler rollers (e.g., non-motorized conveyor rollers) that are operatively coupled thereto. For example, in various embodiments, the exemplary drive roller 101 may define at least a portion of a conveyor section defined within an exemplary conveyor assembly (e.g., by a conveyor apparatus) and/or a corresponding system, the conveyor section being part of an automated or semi-automated warehousing system in which objects may be stored, retrieved, conveyed, and/or the like in response to system instructions and/or user interactions via a computing entity (such as the user computing entity 108 described above in connection with FIG. 1). For example, the example drive roller 101 may be configured to convey objects along at least a portion of a conveyor (e.g., along a conveyor section) based at least in part on system instructions.

As depicted in FIG. 5A, in various embodiments, an exemplary drive roller 101 may comprise a housing 103 (e.g., roller tube) configured to contain one or more components/elements of the drive roller 101 (e.g., a controller component, as discussed in further detail below). In some examples, the housing 103 (e.g., roller tube) of the drive roller 101 comprises a hollow cylindrical body and may comprise metal, plastic, combinations thereof, and/or the like.

As further illustrated in FIG. 5A, an exemplary drive roller 101 may comprise a first end cap 1001 defining a first end/surface of the example drive roller 101. As depicted, the first end cap 1001 may comprise a first appendage 101a configured to be operatively coupled to a conveyor, such as, for example, at a first sidewall, within an aperture of a first rail, and/or the like. Further, as illustrated, an exemplary drive roller 101 may comprise a second end cap 1002 defining a second end/surface of the example drive roller 101. As depicted, the second end cap 1002 may comprise a second appendage 102a configured to be operatively coupled to a conveyor, such as, for example, at a second sidewall arranged opposite the first sidewall, within an aperture of a second rail, and/or the like. As further depicted in FIG. 5A, the drive roller 101 comprises a power cable disposed adjacent the second end cap 1002 that is configured to be connected to a power supply. Additionally and/or alternatively, the power cable 105 may also be configured to provide an electronic connection for wired data transfer between the drive roller 101 (e.g., a controller disposed therein) and one or more components of the conveyor assembly, such as, for example, an imaging device, one or more other drive rollers, and/or the like.

Further, as illustrated, an exemplary drive roller 101 may comprise a plurality of clutch bearing grooves defined at least partially along an outer surface of the roller 100 and configured such that the drive roller 101 may receive at least a portion of a drive band therein to facilitate an operative connection between the drive roller 101 and one or more other rollers of the plurality defining a conveyor section. In various embodiments, as illustrated, an exemplary drive roller 101 may comprise a first clutch bearing groove 110 and a second clutch bearing groove 120, each being configured for receiving a respective drive band therein. For example, in various embodiments, the first clutch bearing groove 110 may be configured for receiving receive at least a portion of a first drive band therein such that the first drive band may be looped around both the drive roller 101 (e.g., within the first clutch bearing groove 110) and at least one leading idler roller within a conveyor section (e.g., at least one of the plurality of rollers of the conveyor section controlled by the drive roller 101 that is arranged in an upstream position relative to the drive roller 101, as defined along the transportation path) so as to operatively connect the drive roller to the at least one leading idler roller. For example, a first drive band may frictionally engage each of the drive roller and the at least one leading idler roller such that, in various embodiments, such as, for example, when a first clutch-activated bearing element 111 within the first clutch bearing groove 110 is in an engaged configuration, a rotational movement of the drive roller 101 may result in an at least substantially similar rotation of the at least one leading idler roller operatively connected therewith. Further, in various embodiments, the second clutch bearing groove 120 may be configured for receiving receive at least a portion of a second drive band therein such that the second drive band may be looped around both the drive roller 101 (e.g., within the second clutch bearing groove 120) and at least one trailing idler roller within a conveyor section (e.g., at least one of the plurality of rollers of the conveyor section controlled by the drive roller 101 that is arranged in a downstream position relative to the drive roller 101, as defined along the transportation path) so as to operatively connect the drive roller 101 to the at least one trailing idler roller. For example, a second drive band may frictionally engage each of the drive roller 101 and the at least one trailing idler roller such that, in various embodiments, such as, for example, when a second clutch-activated bearing element 121 within the second clutch bearing groove 120 is in an engaged configuration, a rotational movement of the drive roller 101 may result in an at least substantially similar rotation of the at least one trailing idler roller operatively connected therewith.

In various embodiments, an exemplary drive roller 101 may further comprise one or more clutch-activated bearing elements configured for physical engagement with at least a portion of a drive band and for selective rotation with the roller housing 103 and/or relative to the roller housing 103 to facilitate the selective control of at least a portion of idler rollers operatively connected to the drive roller via the drive band. For example, in various embodiments, an exemplary clutch-activated bearing element may be arranged at a clutch bearing groove of the driving roller 100 such that the clutch-activated bearing element may be physically engaged with the portion of a drive band disposed within (e.g., looped around) the clutch bearing groove. For example, a portion of a drive band received within a clutch bearing groove may be frictionally engaged by the clutch-activated bearing element such that a rotational movement of the clutch-activated bearing element may result in a corresponding movement (e.g., rotation) of the drive band and an exemplary idler roller of the conveyor section controlled by the drive roller 101 (e.g., either a leading idler roller or a trailing idler roller) that is engaged therewith. In various embodiments, an exemplary clutch-activated bearing element may define a range of relative rotation with respect to the housing 103 of the drive roller 101, wherein the clutch-activated bearing element may be configured to selectively rotate independently of the housing 103 about the central axis 106 of the drive roller 101 based at least in part on the configuration of a clutch element (not shown) of the drive roller 101 relative to the clutch-activated bearing element.

As illustrated in FIG. 5A, an exemplary drive roller 101 may comprise a first clutch-activated bearing element 111 and a second clutch-activated bearing element 121. The first clutch-activated bearing element 111 may be arranged relative to the first clutch bearing groove 110 such that the first clutch-activated bearing element 111 may physically engage the portion of the first drive band disposed within (e.g., looped around) the first clutch bearing groove 110. In such an exemplary configuration, the first the clutch-activated bearing element 111 may frictionally engage portion the first drive band such that a rotational movement of the first clutch-activated bearing element 111 may result in a corresponding movement (e.g., rotation) of the first drive band and thus, a corresponding rotation of the at least one leading idler roller operatively connected to the drive roller 101 via the first drive band. Further, the second clutch-activated bearing element 121 may be arranged relative to the second clutch bearing groove 120 such that the second clutch-activated bearing element 121 may physically engage the portion of the second drive band disposed within (e.g., looped around) the second clutch bearing groove 120. In such an exemplary configuration, the second clutch-activated bearing element 121 may frictionally engage portion the second drive band such that a rotational movement of the second clutch-activated bearing element 121 may result in a corresponding movement (e.g., rotation) of the second drive band and thus, a corresponding rotation of the at least one trailing idler roller operatively connected to the drive roller 101 via the second drive band.

In various embodiments, an exemplary drive roller 101 may comprise one or more clutch elements (not shown) configured to selectively engage and disengage the one or more clutch-activated bearing elements (e.g., the first clutch-activated bearing element 111 and the second clutch-activated bearing element 121) of the drive roller 101 to control the rotation of the one or more clutch-activated bearing elements relative to the housing 103 of the drive roller 101. For example, in various embodiments, the one or more clutch elements may engage a clutch-activated bearing element to selectively configure the clutch-activated bearing element in an engaged configuration, wherein the clutch element prevents the clutch-activated bearing element from rotating relative to the housing 103 such that the clutch-activated bearing element rotates about the central axis 106 along with the housing 103 of the drive roller 101 (e.g., as controlled by the motor assembly of the drive roller 101). For example, in such an exemplary configuration, a control signal comprising a drive signal that causes a rotation of the drive roller 101 results in a similar rotation of the clutch-activated bearing element, and thus, a corresponding movement (e.g., rotation) of the drive belt frictionally engaged with the clutch-activated bearing element. Further, in various embodiments, the one or more clutch elements may disengage a clutch-activated bearing element to selectively configure the clutch-activated bearing element in a disengaged configuration, wherein the clutch element does not restrict the relative rotation of the clutch-activated bearing element with respect to the housing 103 such that the portion of the clutch-activated bearing element frictionally engaged with the drive belt may remain in an at least substantially stationary position as the housing 103 of the drive roller 101 rotates about the central axis 106. For example, in such an exemplary configuration, a control signal comprising a drive signal that causes a rotation of the drive roller 101 does not correspond to a rotation of the clutch-activated bearing element, and thus, the drive belt frictionally engaged with the clutch-activated bearing element does not exhibit a corresponding movement (e.g., rotation). In various embodiments, an exemplary clutch element may be configured to selectively engage and/or disengage a clutch-activated bearing element based on one or more control signals comprising configuration signals generated by the exemplary conveyor assembly (e.g., the controller).

As described above, the first clutch-activated bearing element 111 and the second clutch-activated bearing element 121 of an exemplary drive roller 101 may each be independently configurable between respective engaged and disengaged configurations. As an illustrative example, the first clutch-activated bearing element 111 may be selectively configured in an engaged configuration defined by the first clutch-activated bearing element 111 being engaged by a clutch element (not shown) of the drive roller 101 such that the rotational position of the first clutch-activated bearing element 111 is fixed relative to the housing 103 and the at least one leading idler rollers operatively connected to the drive roller 101 via the first drive belt frictionally engaged with the first clutch-activated bearing element 111 may be operated (e.g., driven) by a rotation of the drive roller 101. Further, the first clutch-activated bearing element 111 may be selectively configured in a disengaged configuration defined by the first clutch-activated bearing element 111 being disengaged from the clutch element of the drive roller 101 such that the rotational position of the first clutch-activated bearing element 111 is at least substantially unaffected by a rotation of the housing 103 and the at least one leading idler rollers operatively connected to the drive roller 101 via the first drive belt are not operated (e.g., driven) by a rotation of the drive roller 101.

Similarly, as an further illustrative example, the second clutch-activated bearing element 121 may be selectively configured in an engaged configuration defined by the second clutch-activated bearing element 121 being engaged by a clutch element of the drive roller 101 such that the rotational position of the second clutch-activated bearing element 121 is fixed relative to the housing 103 and the at least one trailing idler rollers operatively connected to the drive roller 101 via the second drive belt frictionally engaged with the second clutch-activated bearing element 121 may be operated (e.g., driven) by a rotation of the drive roller 101. Further, the second clutch-activated bearing element 121 may be selectively configured in a disengaged configuration defined by the second clutch-activated bearing element 121 being disengaged from the clutch element of the drive roller 101 such that the rotational position of the second clutch-activated bearing element 121 is at least substantially unaffected by a rotation of the housing 103 and the at least one trailing idler rollers operatively connected to the drive roller 101 via the second drive belt are not operated (e.g., driven) by a rotation of the drive roller 101.

In various embodiments, as described in further detail herein, an exemplary drive roller 101 may be configured such that the first clutch-activated bearing element 111 and the second clutch-activated bearing element 121 may be selectively configured in either the same configuration or different configurations relative to the clutch element. For example, in various embodiments, the first clutch-activated bearing element 111 and the second clutch-activated bearing element 121 may each be selectively configured in an engaged configuration. In such an exemplary configuration, the rotation of the housing 103 may drive the respective rotations of each of the at least one leading idler rollers and the at least one trailing idler rollers operatively connected to the drive roller 101 at the first clutch-activated bearing element 111 and the second clutch-activated bearing element 121, respectively. As described herein, such an exemplary configuration wherein both the first clutch-activated bearing element 111 and the second clutch-activated bearing element 121 are in an engaged configuration may define a single-zone configuration of an exemplary conveyor section being controlled by the drive roller 101. Further, in various embodiments, the first clutch-activated bearing element 111 and the second clutch-activated bearing element 121 may be selectively configured in different configurations, such as, for example, the first clutch-activated bearing element 111 defining an engaged configuration while the second clutch-activated bearing element 121 defines a disengaged configuration or the first clutch-activated bearing element 111 defining a disengaged configuration while the second clutch-activated bearing element 121 defines an engaged configuration. In such an exemplary configuration, the rotation of the housing 103 may drive the rotation of only the particular set of idler rollers (e.g., either the at least one leading idler roller or the at least one trailing idler roller) that is operatively connected to the drive roller 101 at the clutch-activated bearing element provided in an engaged configuration, while the other set of idler rollers remain at least substantially stationary. As described herein, such an exemplary configuration wherein one of the first clutch-activated bearing element 111 and the second clutch-activated bearing element 121 is selectively configured in an engaged configuration and the other is selectively configured in a disengaged configuration may define a dual-zone configuration of the exemplary conveyor section.

Referring now to FIG. 5B, a side cross-section view of an exemplary drive roller 101 in accordance with various embodiments of the present disclosure is illustrated. In particular, FIG. illustrates a side cross-section view of the exemplary drive roller 101 discussed above in connection with FIG. 5A. As illustrated in FIG. 5B, an exemplary drive roller 101 may comprise a housing 103 embodying an exterior shell that defines an interior roller portion 109 comprising a hollow internal volume within the housing 103 that extends along a central axis 106 thereof between the opposing first and second end caps 101, 102 of the drive roller 101. Further, in various embodiments, an exemplary drive roller 101 comprises a power cable 105, a motor assembly 150, a drive assembly 140, a controller component 160, and a bearing assembly 130, each being at least partially disposed within the housing 103 of the drive roller 101. In various embodiments, at least a portion of the elements/components of the drive roller 101 (e.g., the motor assembly 150, the drive assembly 140, and the bearing assembly 130) are in electronic communication with the controller component 160 such that various data/information (e.g., object data, control signals, and/or the like) may be communicated between the controller component 160 and each of the components in electronic communication therewith.

As noted above, and as depicted in FIG. 5B, the example drive roller 101 may comprise a motor assembly 150, a drive assembly 140 and at least one bearing assembly 130 configured to facilitate an operation/driving/rotation of the housing 103 (e.g., roller tube) of the drive roller 101 with respect to a central axis 106 of the drive roller 101. In various embodiments, as shown, at least at portion (e.g., a surface) of the motor assembly 150 and at least a surface of the drive assembly 140 may be in contact with an inner surface of the housing 103 (e.g., roller tube) of the drive roller 101. For example, a drive roller 101 may comprise a drive assembly 140 configured to transfer torque from the motor assembly 150 to the housing 103 (e.g., roller tube) of the drive roller 101. In some embodiments, the drive assembly 140 may be fixed relative to the housing 103 (e.g., roller tube), while the motor assembly 150 is fixed relative to a frame component supporting the roller tube, such that the motor assembly 140 can rotate the drive assembly 140 and the roller tube.

Additionally, as illustrated, the example drive roller 101 comprises a bearing assembly 130 configured to, in conjunction with the motor assembly 150 and drive assembly 140, facilitate operation of the drive roller 101 defined by a rotation of the drive roller 101 (e.g., the housing 103) about the central axis 106. As shown, the bearing assembly 130 may be disposed at least substantially adjacent to and operatively coupled with a first end cap 101 of the drive roller 101. In various embodiments, the drive roller 101 comprises a first clutch-activated bearing element 111 and a second clutch-activated bearing element 121 that may be configured for rotation either with at least a portion of the bearing assembly 140 (e.g., the housing 103) and/or relative to the at least a portion of the bearing assembly 140 (e.g., the housing 103) based at least in part on the selective configuration of one or more clutch elements (not shown) to facilitate the selective configuration of the conveyor section controlled by the drive roller 101 between a single-zone configuration and a dual zone configuration, as described herein.

As noted above, and as depicted in FIG. 5B, in various embodiments, an exemplary drive roller 101 may comprises a controller component 160 disposed within the housing 103 of the drive roller 101. As depicted, the controller component 160 may be at least partially disposed within the housing 103 (e.g., roller tube) of the drive roller 101. For example, in various embodiments, as illustrated, the controller component 160 may be disposed between the bearing assembly 130 and the drive assembly 140. In various embodiments, the controller component 160 may comprise one or more printed circuit boards (PCBs). For example, as depicted, the controller component 160 comprises a PCB stack comprising three PCB boards configured to be in electronic communication with one another. In various embodiments, the controller component 160 may comprise a controller module that is configured to control operations of the motor assembly 150, drive assembly 140, a bearing assembly 130, and/or the like. In some embodiments, as described herein, the controller component 160 may comprise a wireless communication module configured to provide a communication interface (e.g., Bluetooth, Bluetooth Low Energy (BLE), low-power wide-area network such as Long Range (LoRa), and/or the like) between the drive roller 101 and one or more components of the conveyor assembly, such as, for example, one or more other drive rollers of a plurality of rollers defined by the conveyor assembly. Additionally, in some embodiments, the controller component 160 may comprise a power module configured to control various operations of one or more electronic elements (e.g., circuitry, sensing element and/or the like) of the drive roller 101.

In various embodiments, an exemplary conveyor assembly may be defined by one or more conveyor zones defined by a plurality of rollers that are configured for simultaneous control (e.g., rotation) by an exemplary drive roller to facilitate transportation of an object 1 along a transportation path defined by the conveyor assembly. For example, referring back to the exemplary conveyor assembly 10 illustrated in FIG. 4, an exemplary conveyor assembly 10 may be defined by a plurality of conveyor zones 200 that each comprise a plurality of rollers configured for simultaneous control (e.g., rotation) by an exemplary drive roller defined within the conveyor zone 200. For example, in various embodiments, the sequence of conveyor zones 200 defined within a conveyor section of an exemplary conveyor assembly 10 may be defined using empirical length measurements along the transportation path 11. As a non-limiting example provided for illustrative purposes, a first conveyor zone 201 may span the first ten meters of the transportation path 11 and the second conveyor zone 202 adjacent to the first conveyor zone 201 may span the next seven meters of the transportation path 11 defined immediately downstream of the first conveyor zone 201. In various embodiments, the length of each conveyor zone 200 defined along the transportation path 11 may be based at least in part on a length of the object(s) 1 to be transported (or being transported) by the conveyor assembly 10 along the plurality of rollers 100 defining an exemplary conveyor section. For instance, in various non-limiting embodiments, each conveyor zone 200 may be defined by a zone length that is at least substantially longer than a length of the object(s) 1 to be transported such that each object can be transported independently through independent control of each conveyor zone 200.

Figure 6A:
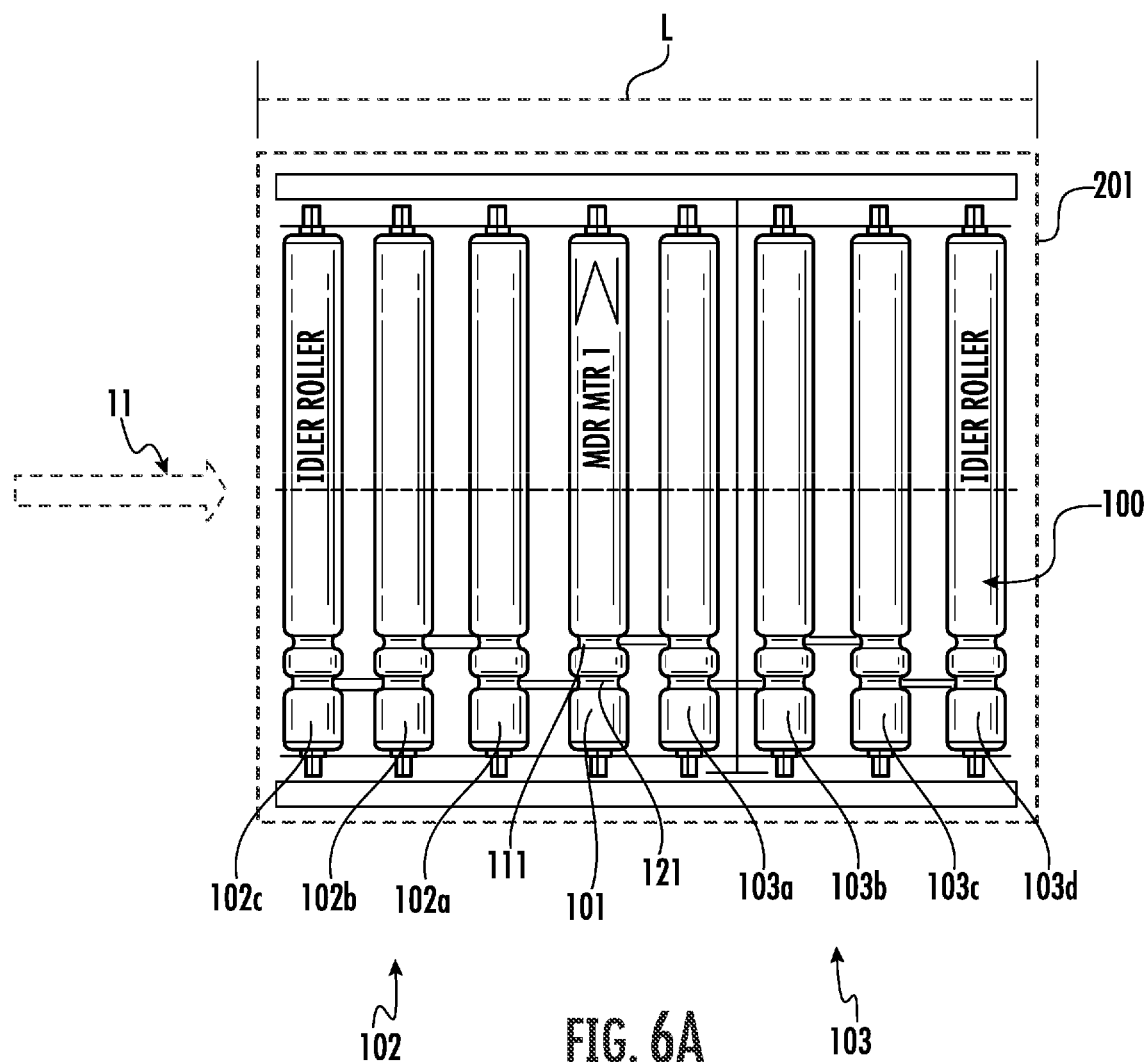
FIGS. 6A and 6B schematically illustrate a top view of a conveyor section of an exemplary conveyor assembly according to example embodiments described herein.
Figure 6B:
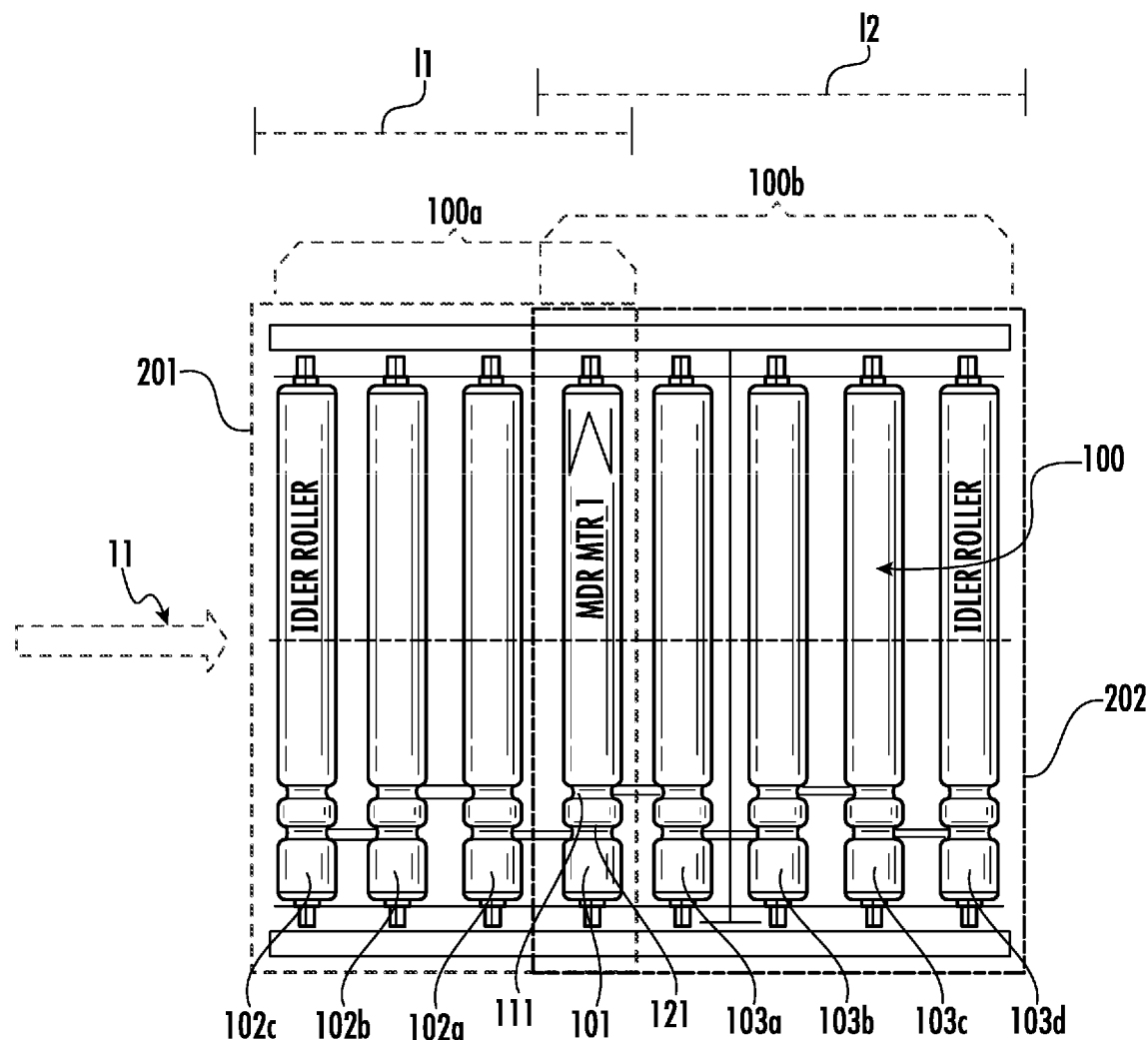

In various example embodiments, one or more of the conveyor zones 200 of the conveyor assembly 10 may be dynamically defined based at least in part on a detected length of each object 1 being transported by the conveyor assembly 10. In such an exemplary configuration, an exemplary conveyor assembly 10 may be portioned into a sequence of conveyor zones 200 based at least in part on a determined object length associated with each object 1, with the conveyor assembly 10 transporting a plurality of objects 1 with different lengths. For example, the conveyor section of the exemplary conveyor assembly 10 may be operated as a single conveyor zone or selectively portioned into a plurality of conveyor zones based at least in part on one or more configuration signals generated by the conveyor assembly 10 (e.g., a controller) and communicated to the drive roller of the conveyor section in response to a determined object length associated with an object 1. As a non-limiting illustrative example, FIGS. 6A and 6B illustrate top views of a conveyor section of an exemplary conveyor assembly according to example embodiments described herein. In particular, FIG. 6A illustrates a conveyor section defined by a plurality of rollers 100, the conveyor section being configured in a single-zone configuration defined by each of the plurality of rollers 100 being included in a single conveyor zone 201. Further, FIG. 6B illustrates the conveyor section defined by the plurality of rollers 100 shown in FIG. 6A, the conveyor section being configured in a dual-zone configuration defined by a first conveyor zone 201 that is defined by a first portion 100a of the plurality of rollers 100 and a second conveyor zone 202 that is defined by a second portion 100b of the plurality of rollers 100, wherein the first and second conveyor zones 201, 202 are each independently controllable by the drive roller 101. In various embodiments, an exemplary conveyor assembly 10 may be configured such that the conveyor section defined by a plurality of rollers 100 may be dynamically adjusted between the single-zone configuration illustrated in FIG. 6A—wherein each of the plurality of rollers 100 make up a single conveyor zone 201 that is controlled by a drive roller 101 and defined within the conveyor section—and a dual-zone configuration, as illustrated in FIG. 6B—wherein the first portion 100a of the plurality of rollers 100 makes up a first conveyor zone 201 and a second portion 100b of the plurality of rollers 100 makes up a second conveyor zone 201, each being defined within the conveyor section and independently controlled by the same drive roller 101—based at least in part on the selective configuration of the drive roller 101 in one of a first operating condition and a second operating condition. For example, the selective configuration of the drive roller 101 between the first operating condition and the second operating condition may be defined based at least in part on the selective configuration of each of one or more clutch-activated bearing elements, such as, for example, a first bearing element configured to facilitate operative connection of the drive roller 101 to the leading idler rollers and a second bearing element configured to facilitate operative connection of the drive roller 101 to the trailing idler rollers, of the drive roller 101.

As illustrated in FIGS. 6A and 6B, an exemplary conveyor section may be defined by a plurality of rollers 100 that are each configured to be operated by a motor of a drive roller 101. The plurality of rollers defining an exemplary conveyor section may include the drive roller 101, a set of leading idler rollers 102 (e.g., a first leading idler roller 102a, a second leading idler roller 102b, and a third leading idler roller 102c), and a set of trailing idler rollers 103 (e.g., a first trailing idler roller 103a, a second trailing idler roller 103b, and a third trailing idler roller 103c). As illustrated, the set of leading idler rollers 102 is defined by a first portion of the plurality of rollers 100 operatively connected to the drive roller 101 that are arranged in an upstream position from the drive roller 101 and the set of trailing idler rollers 103 is defined by a second portion of the plurality of rollers 100 operatively connected to the drive roller 101 that are arranged in a downstream position from the drive roller 101, as defined along the transportation path 11. In various embodiments, the drive roller 101 may be operatively connected to the set of leading idler rollers 102 via a first drive belt that is frictionally engaged with the drive roller 101 at a first clutch-activated bearing element 111. Further, the drive roller 101 may be operatively connected to the set of trailing idler rollers 103 via a second drive belt that is frictionally engaged with the drive roller 101 at a second clutch-activated bearing element 121.

As illustrated, in various embodiments, a drive roller 101 may be configured to facilitate dynamic adjustment of a conveyor section between a single-zone configuration and a dual-zone configuration based at least in part on one or more control signals generated in response to a detected object length of an object traveling along the transportation path 11 defined by an exemplary conveyor assembly. As described herein, the selective configuration of a conveyor section operated by a drive roller 101 between a single-zone configuration and a dual-zone configuration may be defined by the selective configuration of the first and second clutch-activated bearing elements 111, 121 of the drive roller 101 between engaged and disengaged configurations.

For example, in various embodiments, a drive roller 101 of an exemplary conveyor assembly 10 may be configured to drive respective rotations of each of the plurality of rollers 100 defining the conveyor section. As illustrated in FIG. 6A, an exemplary conveyor assembly may be configured such that, in a first exemplary instance wherein the conveyor assembly (e.g., an imaging device) detects that a length of an object disposed at an infeed portion of the conveyor section is at least substantially greater than (e.g., greater than or equal to) a predetermined length threshold, the exemplary conveyor assembly 10 (e.g., a controller) may generate one or more control signals (e.g., configuration signals) configured to cause a drive roller 101 to be configured according a first operating condition, wherein the drive roller 101 remains in control of both the set of leading idler rollers 102 and the set of trailing idler rollers 103 of the plurality 100 defining the conveyor section, such that operation the drive roller 101 may simultaneously drive each of the rollers of the conveyor section. In such an exemplary circumstance, the conveyor section may define a single-zone configuration. For example, in response to a detection of an object having an object length that is at least substantially greater than a predetermined length threshold, the drive roller 101 may be configured according to a first operating condition defined by both the first clutch-activated bearing element 111 and the second clutch-activated bearing element 121 being configured in an engaged configuration relative to a clutch element of the drive roller 101. In such an exemplary configuration, a rotation of the drive roller 101 may drive respective rotations of each of the set of leading idler rollers 102 and each of the set of trailing idler rollers 103 such that the conveyor section is operated in a single-zone configuration defined by a singular conveyor zone 201.

Further, FIG. 6B illustrates the conveyor section described above in reference to FIG. 6A in a second exemplary instance, wherein the conveyor assembly (e.g., an imaging device) detects that an object length of an object disposed at an infeed portion of the conveyor section is at least substantially less than a predetermined length threshold. In such an exemplary circumstance, the exemplary conveyor assembly (e.g., a controller) may generate one or more control signals configured to cause a drive roller 101 to be configured according a second operating condition (e.g., reconfigured and/or switched from a first operating condition), wherein the drive roller 101 is configured to independently operate the set of leading idler rollers 102 and the set of trailing idler rollers 103. For example, in the second operating condition, the drive roller 101 may selectively operate one of either the set of leading idler rollers 102 or the set of trailing idler rollers 103 at a particular instance while the other set is not subjected to the driving force of the drive roller 101. In such an exemplary configuration, as illustrated in FIG. 6B, the conveyor section may define a dual-zone configuration, wherein a first conveyor zone 201 within the conveyor section is defined by a first portion 100a of the plurality of rollers 100 (e.g., the set of leading idler rollers 102) and a second conveyor zone 202 within the conveyor section is defined by the second portion 100b of the plurality of rollers 100 (e.g., the set of trailing idler rollers 103). For example, in response to a detection of an object having an object length that is at least substantially less than a predetermined length threshold, the drive roller 101 may be configured according to a second operating condition defined by the first clutch-activated bearing element 111 being configured in an engaged configuration and the second clutch-activated bearing element 121 being configured in a disengaged configuration relative to a clutch element of the drive roller 101. In such an exemplary configuration, a rotation of the drive roller 101 may drive a corresponding rotation of each of the set of leading idler rollers 102, while the set of trailing idler rollers 103 is not subjected to the driving force of the drive roller 101 such that the trailing idler rollers 103 are unaffected by the rotation of the drive roller 101.

In such an exemplary configuration, wherein conveyor section is operated in a dual-zone configuration defined by a first conveyor zone 201 and a second conveyor zone 202, upon determining that the object travelling along the transportation path 11 is positioned at an infeed position of the second conveyor zone 202, an exemplary conveyor assembly may generate one or more control signals configured to cause the second clutch-activated bearing element 121 to be reconfigured from the disengaged configuration to an engaged configuration such that the drive roller 101 may be used to drive the transportation of the object through the second conveyor zone 202. As described herein, in such an exemplary configuration, a rotation of the drive roller 101 drives a corresponding rotation of each of the set of trailing idler rollers 103. Further, upon determining that the object has traveled through a discharge position of the first conveyor zone 201, the exemplary conveyor assembly may generate one or more control signals configured to cause the first clutch-activated bearing element 111 to be reconfigured from the engaged configuration to a disengaged configuration such that the set of trailing idler rollers 103 is not subjected to the driving force of the drive roller 101 and the rotation of the drive roller 101 as the object travels through second conveyor zone 202 does not affect the set of leading idler rollers 102.

As illustrated in FIGS. 6A and 6B, an exemplary conveyor assembly may be configured to dynamically adjust the configuration of a conveyor section controlled by a drive roller 101 between a single-zone configuration and a dual-zone configuration—each configuration being defined by one or more operations using the same drive roller 101—based at least in part on the detected object length of an object to be received by the conveyor section, such that the conveyor section may be selectively configured to maximize the throughput of a plurality of distinctly dimensioned objects being transported along the transportation path 11. For example, in various embodiments, the exemplary conveyor assembly may be configured to maximize throughput along a conveyor section by, upon determining that a first object has an object length (e.g., as defined in the direction of the transportation path) that is less than a predetermined length threshold, selectively reducing the zone length of one or more conveyor zones defined along the transportation path so as to minimize the wait time required before a second object can be fed into the conveyor section. For example, conveyor assembly may be configured to maximize throughput through a conveyor section (e.g., along a transportation path 11) by selectively reconfiguring the drive roller 101 such that the conveyor section is switched between the single-zone configuration illustrated in the exemplary embodiment shown in FIG. 6A and the dual-zone configuration illustrated in the exemplary embodiment shown in FIG. 6B. As illustrated, the singular conveyor zone 201 of FIG. 6A is defined by a zone length L1. Upon being configured in the dual-zone configuration, as illustrated in FIG. 6B, the first conveyor zone 201 and the second conveyor zone 202 of the conveyor section may be defined by the first zone length 11 and the second zone length 12, respectively, each of which is at least substantially less than the zone length L1 defined by the exemplary embodiment illustrated in FIG. 6A. For example, the predetermined length threshold, as described herein, may be at least substantially less than both the first zone length 11 and the second zone length 12. Accordingly, the reduced zone lengths 11, 12 of the first and second conveyor zones 201, 202 may be closer in length-relative to the full zone length L1 defined by the singular conveyor zone of the conveyor section in the single-zone configuration—to a small object having an object length less than the predetermined length threshold, thereby enabling the conveyor assembly to execute a more efficient transportation of a plurality of objects along a transportation path 11. As described herein, the use of a drive roller 101 that is selectively configurable between a first operating condition and a second operating condition corresponding to a single-zone configuration and a dual-zone configuration, respectively, allows for the conveyor assembly to execute a bespoke transportation operation defined by a more granular control of differently dimensioned objects as they pass through the conveyor section controlled by the drive roller 101.

In various embodiments, an exemplary conveyor assembly 10 may comprise one or more imaging devices configured to capture object data associated with one or more objects positioned at least substantially near and/or within a line of sight of the imaging device, such as, for example, at an infeed position of a conveyor section defined by a plurality of rollers. For example, referring back to FIG. 4, an exemplary conveyor assembly 10 may include at least one imaging device 13 configured to capture object data associated with one or more objects 1 positioned relative to one or more of a plurality of rollers 100 at least substantially near and/or within a line of sight of the imaging device 13, such as, for example, at an infeed position of a conveyor section defined by the plurality of rollers 100. In various embodiments, an exemplary imaging device 13 may be configured to capture object data associated with an object 1 when the object 1 is in an imaging position. For example, the object data associated with an object 1 may comprise one or more object characteristics of the object 1, such as, for example, an object length. As described herein, upon the object 1 being disposed within a conveyor zone operated by (e.g., driven by) an exemplary drive roller that is at least partially downstream from the imaging position defined by the imaging device 13 (e.g., as measured along the transportation path 11), an exemplary conveyor assembly 10 may be configured to selectively configure the drive roller in either a first operating condition or a second operating condition based at least in part on the object data (e.g., object length) associated with the object 1. For example, based at least in part on object data captured by the imaging device 13 indicating an object length as being less than a predetermined threshold value, a drive roller initially provided in a first operating condition, wherein the drive roller simultaneously controls each of a plurality of rollers 100 of a single-zone conveyor section (e.g., including leading idler rollers and trailing idler rollers), may be selectively reconfigured to a second operating condition, wherein the drive roller is configured for independently and selectively controlling the leading idler rollers and the trailing idler rollers such that the conveyor section controlled by the drive roller is switched to a dual-zone configuration (e.g., a first conveyor zone being defined by the leading idler rollers and a second conveyor zone being defined by the trailing idler rollers).

In various embodiments, an imaging device 13 may refer to any device, camera, sensor, and/or the like configured to detect at least the presence of an object (e.g., object 1 being transported) that is positioned near (e.g., within some threshold distance) of the imaging device 13. That is, in various embodiments, an imaging device 13 may be associated with a range or a threshold distance within which the imaging device 13 may detect at least the presence of an object (e.g., one or more object characteristics associated with the object 1) with accuracy.

In various embodiments, an imaging device 13 may involve light-based detection and may include an emitter and a receiver, the emitter configured to emit light or some like signal and the receiver configured to detect the light or like signal emitted by the emitter. The imaging device 13 may then be configured to detect the presence of objects within its range based at least in part on a difference in the light or signal detected by the receiver. For instance, the light may be obstructed, reflective, refracted, and/or the like by an object positioned near the imaging device 13, and the light may then be detected by the receiver. In various embodiments, the imaging devices 13 of a MDR conveyor assembly 10 may be through-beam imaging devices, retro-reflective imaging devices, diffuse-reflective imaging devices, and/or the like, which each involve light-based detection.

In various embodiments, the receiver and emitter for an imaging device 13 comprising a through-beam imaging device may be positioned opposite to each other, for example, in different sidewalls 12, with the emitter directly transmitting light to the receiver. In such an exemplary circumstance, the through-beam imaging device may be configured to detect objects based at least in part on objects obstructing the light transmitted directly from the emitter to the emitter.

Further, in various embodiments, an imaging device 13 may comprise a retro-reflective imaging device including a retroreflector positioned opposite to both the emitter and the receiver, for example, with the emitter and the receiver being positioned in one sidewall 12 and the retroreflector being positioned in another sidewall 12. In such an exemplary circumstance, the retro-reflective imaging device may then detect an object 1 positioned between the emitter/receiver and the retroreflector based at least in part on the object obstructing the light from being reflected by the retroreflector to the receiver and/or based at least in part on the object reflecting the light away from the receiver. In some examples, a retro-reflective imaging device may have less accuracy than a through-beam imaging device, but may be uniquely adapted to detect objects with some level of transparency.

Further, in various embodiments, an imaging device 13 may comprise a diffuse-reflective imaging device including the emitter and the receiver positioned within the same housing (e.g., at one sidewall 12), and a diffuse-reflective imaging device may detect objects 1 based at least in part on the objects 1 reflecting light emitted by the emitter to the reflector. In various embodiments, the detection accuracy of a diffuse-reflective imaging device may be affected at least in part by the surface characteristic of various different objects 1, each of which may reflect light differently.

In various embodiments, an imaging device 13 of an exemplary conveyor assembly 10 may be a camera or an image capture device that is configured to detect the presence of objects. For instance, a camera or other image capture device may be calibrated with an image in which no object is present and may determine based at least in part on real-time capture of images whether an object 1 is present or not. As another non-limiting example, an imaging device 13 of a conveyor assembly 10 may comprise an X-ray device, a computed tomography (CT) device, and/or another device configured for radiation-based object detection. In various examples in which an imaging device 13 is configured for radiation-based object detection, the imaging device may be further configured to examine the internal characteristics (e.g., stored objects) within a detected object. In various embodiments, an imaging device 13 may detect, with the presence of an object, other aspects of an object, including a color, a classification, a surface material, and/or the like. In some example instances, objects 1 transported by the conveyor assembly 10 may include labels, tags, and/or the like, and imaging devices 13 of the MDR conveyor assembly 10 may be configured to detect and/or recognize such labels, tags, and/or the like.

Various embodiments of the present disclosure relate to a conveyor assembly 10 comprising an infeed imaging device, or an imaging device 13 positioned substantially near the infeed point at which objects 1 may be provided to a conveyor system. In some example embodiments described herein, the conveyor assembly 10 may further include a discharge imaging device, or an imaging device 13 positioned substantially near the discharge point to which the conveyor system is configured to transport objects. In various embodiments, the infeed imaging device and the discharge imaging device may be any type of imaging device, including the imaging devices 13 described above, and may be configured to detect objects using light-based detection techniques, image-based detection techniques, radiation-based detection techniques, and/or the like. The infeed imaging device and the discharge imaging device (and/or components thereof) may be positioned within, attached to, located substantially near, and/or the like the sidewalls 12 of the conveyor assembly 10. Thus, for example, the infeed imaging device and the discharge imaging device to not obstruct the transportation path 11.

In various embodiments, imaging devices 13 of the conveyor assembly 10 may be oriented to be at least substantially perpendicular to the transportation path 11, such that imaging devices 13 are configured to detect objects 1 that are positioned along the transportation path 11 at approximately the same position defined along the length of the conveyor assembly 10 (e.g., along the length of a conveyor section defined by a conveyor apparatus). Thus, for example, an imaging device 13 positioned at an infeed zone is oriented to detect objects within the infeed zone by being oriented to be at least substantially perpendicular to the transportation path 11. In various embodiments, an exemplary conveyor assembly 10 may comprise one or more imaging devices 13 positioned at a particular conveyor zone of a plurality of conveyor zones 200 defined by the conveyor assembly 10 in an orientation wherein the imaging device 13 is not configured to detect objects present in other conveyor zones 200 other than the particular conveyor zone. Further, in various embodiments, the conveyor assembly 10 may comprise a plurality of imaging devices 13, each corresponding to a respective conveyor zone of a plurality of conveyor zones 200, at least a portion of the plurality of imaging devices 13 being arranged at an infeed position with respect to the respective conveyor zone.

In various embodiments, an object's location along a transportation path 11 defined by an exemplary conveyor assembly 10 may be predicted and/or mapped based at least in part on object data associated with the object 1 comprising an initial detection of the object 1 using an imaging device comprising an infeed imaging device 13a. Further, in some example embodiments, the prediction and mapping of the object's real-time location is verified and re-configured from another detection of the object using the discharge imaging device 13b. In various embodiments, object data comprising an object's length as defined in a direction at least substantially parallel with the transportation path 11 may be determined based at least in part on object data associated with the object 1 that is captured using an imaging device comprising an infeed imaging device 13a. Further, in some example embodiments, the identification and/or determination of an object's length may be verified and/or reconfigured from second object data comprising the object's length as captured by a discharge imaging device 13b.

In various embodiments, a first conveyor zone 201 of an exemplary conveyor assembly 10 may be referred to as an infeed conveyor zone, while a final zone 204 of the conveyor assembly 10 may be referred to as a discharge conveyor zone. In various embodiments, as illustrated in the exemplary embodiments shown in FIG. 4, an object 1 may be detected first at the infeed conveyor zone 201 by an infeed imaging device 13a (e.g., an infeed photo-eye), and based at least in part on the object 1 being detected at the infeed conveyor zone 201, a rotational speed (e.g., a speed at which the rollers 100a defining the infeed conveyor zone 201 rotate) for the infeed conveyor zone 201 may be controlled (e.g., to move the object 1 at a desired translation speed, to stop the object 1 at the infeed conveyor zone). In various embodiments, based at least in part on an elapsed time that the object 1 is detected by the infeed imaging device 13a at the infeed conveyor zone 201 and the controlled drive roller rotational speed as defined by the drive roller within the infeed conveyor zone 201, an exemplary conveyor assembly 10 (e.g., a controller) may determine an object length of the object 1.

In various embodiments, the exemplary conveyor assembly 10 may be further configured to generate a virtual map configured to describe a predicted location of the object 1 within the conveyor assembly 10, such as, for example, along the transportation path 11, in real-time and/or at a plurality of given timepoints. For example, using the object length associated the object 1, as determined by the conveyor assembly 10, and the rotational speed of the infeed conveyor zone 201, the presence of the object 1 in a second conveyor zone 202 in an adjacent downstream position relative to the infeed conveyor zone 201 may be predicted. Similarly, upon prediction that the object 1 is present within the second conveyor zone 202, a rotational speed for the second conveyor zone 202 may be configured by the conveyor assembly 10 (e.g., by a controller) In various embodiments, using the determined length of one or more objects 1 and a rotational speed defined by the rollers in each conveyor zone 200 in which the object 1 is present over time, the object's presence in each subsequent conveyor zone of the plurality 200 defined by the conveyor assembly 10 may be predicted and mapped via the virtual map, such that the selective and/or sequential configuration of each drive roller associated respectively with each of the plurality of conveyor zones 200 between a first operating condition (e.g., wherein the conveyor section associated therewith defines a single-zone configuration) and a second operating condition (e.g., wherein the conveyor section associated therewith defines a dual-zone configuration), and, further, control of the rotational speed, in each subsequent conveyor zone of the plurality of zones 200 may be enabled without having an imaging device present in each subsequent conveyor zone 200.

Figure 7A:
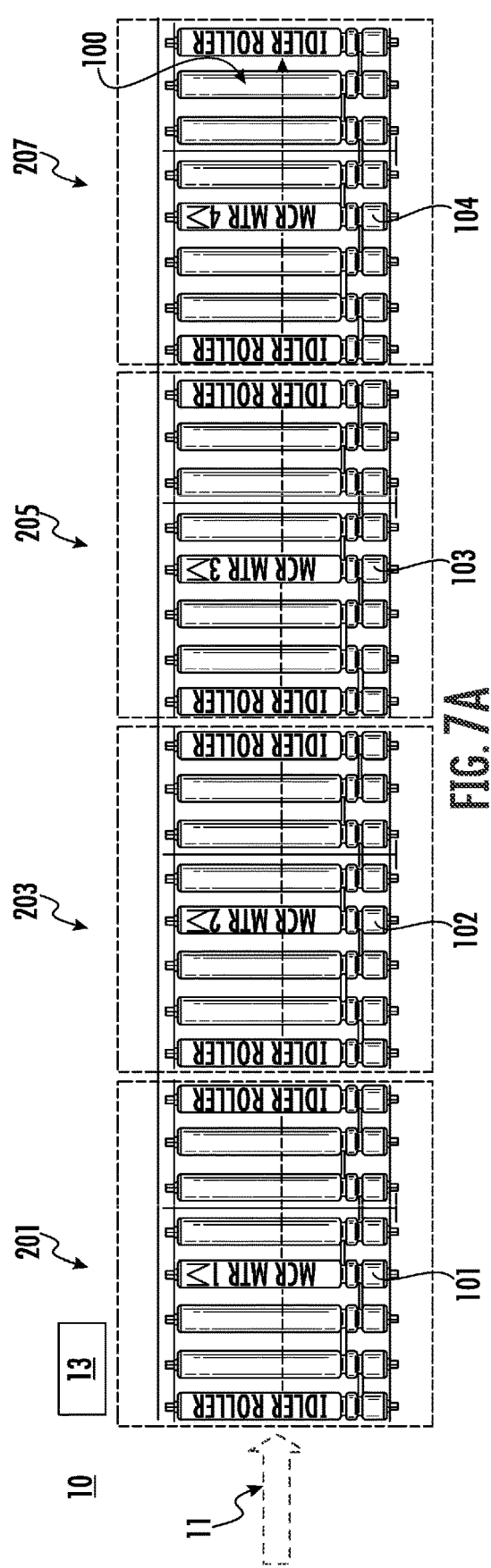
FIGS. 7A and 7B schematically illustrate a top view of an exemplary conveyor apparatus defining a plurality of a conveyor sections according to example embodiments described herein.
Figure 7B:
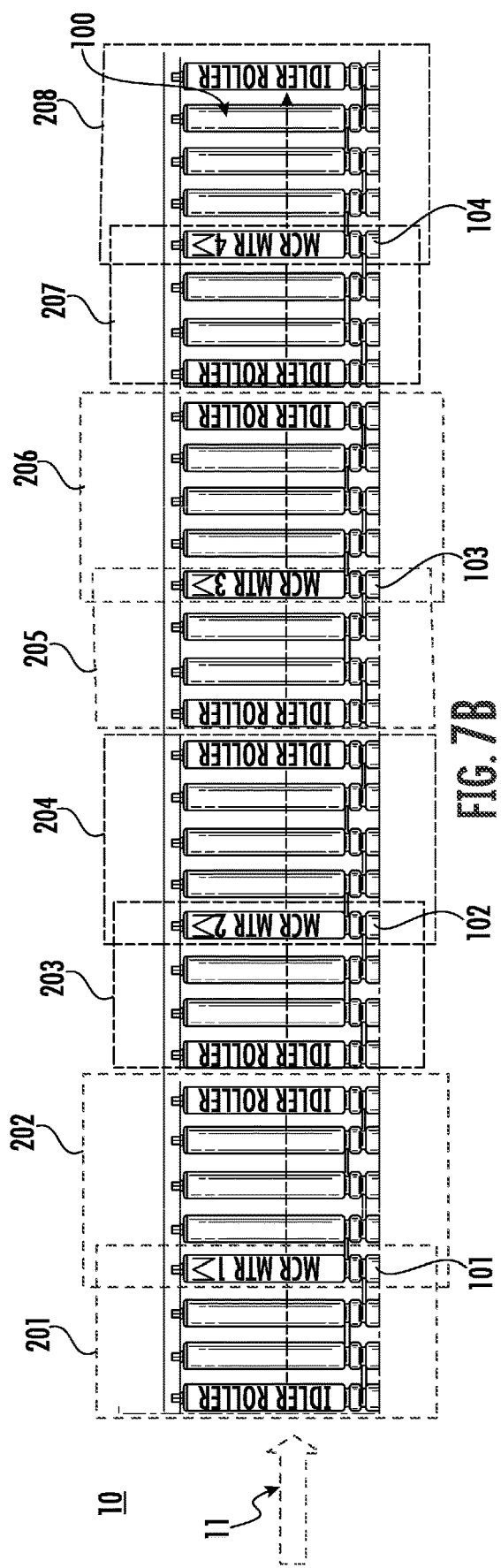

In various embodiments, an exemplary conveyor assembly 10 may comprise a plurality of conveyor sections arranged at least substantially consecutively so as to collectively define a transportation path 11. In various embodiments, each of the plurality of conveyor section may being defined by a respective plurality of rollers configured to be operated by a corresponding drive roller having a selectively adjustable configuration, as described herein, that enables each conveyor section to be selectively configured between a single-zone configuration and a dual-zone configuration. For example, FIGS. 7A and 7B schematically illustrate a top view of an exemplary conveyor apparatus defining a plurality of a conveyor sections according to example embodiments described herein. In particular, FIGS. 7A and 7B illustrate a plurality of individually controlled conveyor sections defined within a conveyor assembly 10 that are each operated by a respective drive roller having a plurality of clutch-activated bearing elements that may be selectively controlled to switch the conveyor section between a single-zone configuration and a dual-zone configuration based on the object lengths of an object to be transported therealong. For example, FIG. 7A illustrates an exemplary embodiment wherein the conveyor assembly 10 comprises four drive rollers, including a first drive roller 101, a second drive roller 102, a third drive roller 103, and a fourth drive roller 104, each configured to control the operation of a respective portion of the idler rollers in the plurality of rollers 100 of the conveyor assembly 10 so as to define four distinct conveyor sections. Each of the four drive rollers 101, 102, 103, 104 comprise a leading end clutch-activated bearing element operatively connected to a set of leading idler rollers and trailing end clutch-activated bearing element operatively connected to a set of trailing idler rollers. As illustrated in FIG. 7A, each of the four drive rollers 101, 102, 103, 104 are configured such that the leading end and trailing end clutch-activated bearing elements thereof are in an engaged configuration relative to a clutch element of the respective drive roller, so as to enable the operation of both the leading idler rollers and trailing idler rollers operatively connected thereto to be simultaneously driven by the rotation of the respective drive roller. In such an exemplary configuration, each of the conveyor sections corresponding to the four drive rollers 101, 102, 103, 104 are provided in a single-zone configuration such that the four conveyor sections collectively define a first conveyor zone 201, a second conveyor zone 202, a third conveyor zone, and a fourth conveyor zone 204. For example, the conveyor assembly 10 may be configured to exhibit such an exemplary configuration in response to a determination that an object to be transported along the transportation path 11 has an object length that is greater than or equal to a predetermined length threshold. In various embodiments, as described herein, such an exemplary determination may be made by the conveyor assembly 10, such as, for example, by a computing entity in communication with each of the plurality of drive rollers, based at least in part on object data captured by an imaging device 13 of the conveyor assembly 10 that is disposed along the transportation path (e.g., at an infeed position of one or more of the conveyor sections).

Further, in various embodiments, the conveyor assembly 10 may determine, based at least in part on object data captured by one or more imaging devices 13 of the conveyor assembly 10, that an object to be transported along the transportation path 11 has an object length that is less than the predetermined length threshold. In such an exemplary circumstance, as illustrated in FIG. 7B, each of the four drive rollers 101, 102, 103, 104 are configured to operate according to a second operating condition wherein that leading end and trailing end clutch-activated bearing elements of each drive roller are selectively configured between engaged and disengaged configurations independently of one another. Such an exemplary configuration enables each of the conveyor sections controlled by the four drive rollers 101, 102, 103, 104 to be provided in a dual-zone configuration such that the first conveyor section controlled by the first drive roller 101 defines a first conveyor zone 201 and a second conveyor zone 202, the second conveyor section controlled by the second drive roller 102 defines a third conveyor zone 203 and a fourth conveyor zone 204, the third conveyor section controlled by the third drive roller 103 defines a fifth conveyor zone 205 and a sixth conveyor zone 206, and the fourth conveyor section controlled by the fourth drive roller 104 defines a seventh conveyor zone 207 and an eight conveyor zone 208. For example, the four drive rollers 101, 102, 103, 104 may be sequentially reconfigured from operating under a first-operating condition—corresponding to each of the idler rollers operatively connected to the respective drive roller being simultaneously controlled as a single conveyor zone—to operating according to the second operating condition, as described herein, such that the corresponding four conveyor sections defined consecutively along the transportation path 11 are reconfigured from a single-zone configuration to the dual-zone configuration in an at least substantially sequential order as the object is approaching and/or passing through the respective infeed position of each conveyor section. As an illustrative example, in various embodiments, the conveyor assembly 10 may be further configured such that, upon determining that an object to be subsequently transported along the transportation path 11 has an object length that is greater than or equal to the predetermined length threshold, the each of the drive rollers 101, 102, 103, 104 may be selectively adjusted back to operating according to the first operating condition such that the corresponding four conveyor sections are reverted back to the single-zone configurations illustrated in the exemplary embodiment shown in FIG. 7A.

Figure 8:
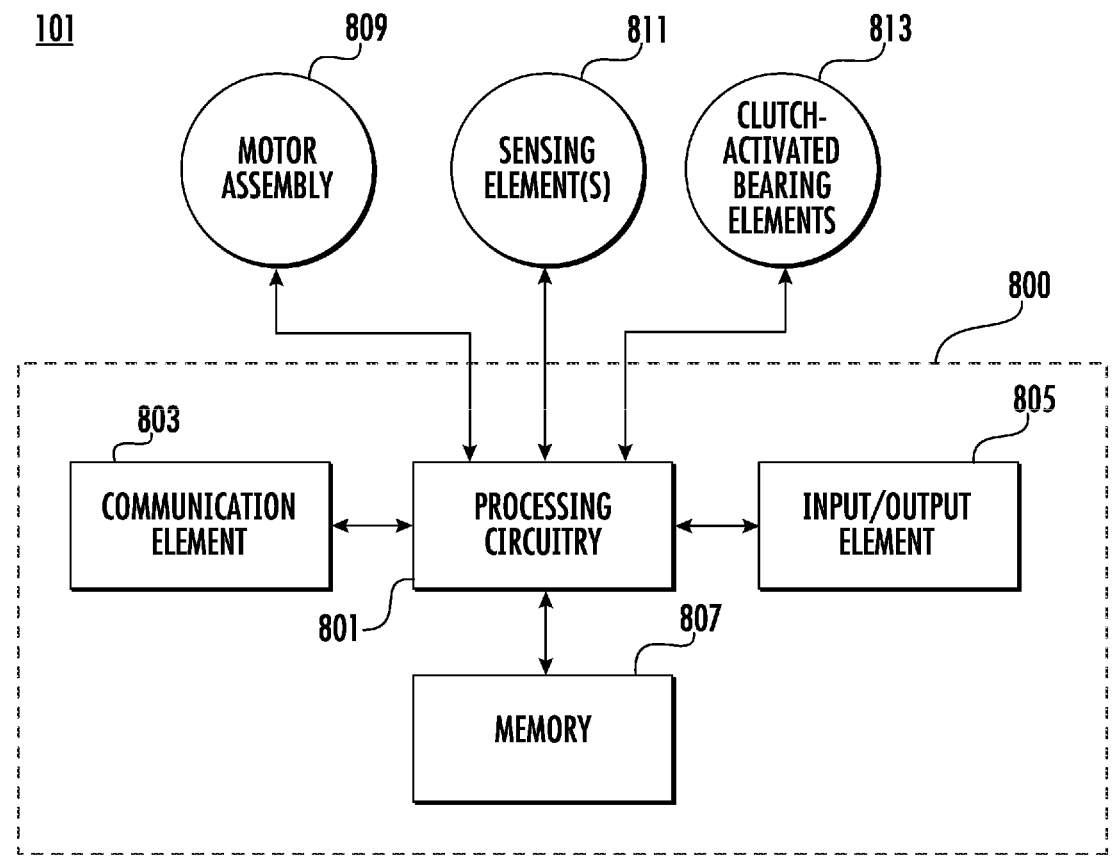
FIG. 8 illustrates an example controller component in electronic communication with various other components of an example conveyor assembly in accordance with various embodiments of the present disclosure.

Referring now to FIG. 8, a schematic diagram depicting an example controller component 800 in electronic communication with a motor assembly 809, sensing element(s) 811 and clutch-activated bearing element(s) 813 (e.g., a leading end clutch-activated bearing element and a trailing end clutch-activated bearing element) of an exemplary drive roller 101 (e.g., a motor driven roller) in accordance with various embodiments of the present disclosure is provided. As shown, the controller component 800 comprises processing circuitry 801, a communication element 803, input/output element 805, a memory 807 and/or other components configured to perform various operations, procedures, functions or the like described herein.

In some embodiments, the controller component 800 may be or comprise a PCB. In some examples, the controller component 800 (e.g., PCB) may further comprise one or more of a full bridge motor driver, a hall sensor, one or more thermal sensors, one or more user interfaces, one or more protection circuits, configuration management circuitry 809, a wireless interface, sensing element circuitry (e.g., image sensor circuitry), an interface connector, power control circuitry, gate driver circuitry and/or the like.

The processing circuitry 801 may be embodied as means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, but not limited to, an application specific integrated circuit (ASIC) or field programmable gate array (FPGA), or some combination thereof. Accordingly, although illustrated in FIG. 8 as a single processor, in an embodiment, the processing circuitry 801 may include a plurality of processors and signal processing modules. The plurality of processors may be embodied on a single electronic device or may be distributed across a plurality of electronic devices collectively configured to function as the circuitry of the motorized drive roller 101. The plurality of processors may be in operative communication with each other and may be collectively configured to perform one or more functionalities of the circuitry of the drive roller as described herein. In an example embodiment, the processing circuitry 801 may be configured to execute instructions stored in the memory 807 or otherwise accessible to the processing circuitry 801. These instructions, when executed by the processing circuitry 801, may cause the circuitry of the drive roller to perform one or more of the functionalities, as described herein.

Whether configured by hardware, firmware/software methods, or by a combination thereof, the processing circuitry 801 may include an entity capable of performing operations according to embodiments of the present disclosure while configured accordingly. Thus, for example, when the processing circuitry 801 is embodied as an ASIC, FPGA or the like, the processing circuitry 801 may include specifically configured hardware for conducting one or more operations described herein. Additionally, or alternatively, when the processing circuitry 801 is embodied as an executor of instructions, such as may be stored in the memory 807, the instructions may specifically configure the processing circuitry 801 to perform one or more algorithms and operations described herein.

Thus, the processing circuitry 801 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a combination thereof. The memory can also be located internal to another computing resource (e.g., enabling computer readable instructions to be downloaded over the Internet or another wired or wireless connection).

The memory 807 may include suitable logic, circuitry, and/or interfaces that are adapted to store a set of instructions that is executable by the processing circuitry 801 to perform predetermined operations. Additionally or alternately, the memory 807 may be configured to store data/information, application programs, instructions, and etc., so that the controller component 800 can execute various functions according to the embodiments of the present disclosure. For example, in at least some embodiments, the memory 807 is configured to cache input data for processing by the processing circuitry 801. Thus, in at least some embodiments, the memory 807 is configured to store program instructions for execution by the processing circuitry 801. The memory 807 may store information in the form of static and/or dynamic information. When the functions are executed, the stored information may be stored and/or used by the controller component 800. Example memory implementations may include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the memory 807 may be integrated with the processing circuitry 801 on a single chip, without departing from the scope of the disclosure.

The communication element 803 may be implemented as any apparatus included in a circuit, hardware, a computer program product or a combination thereof, which is configured to receive and/or transmit data from/to another component or apparatus. The computer program product comprises computer-readable program instructions stored on a computer-readable medium (for example, the memory 807) and executed by a processing component 800 (for example, the processing circuitry 801). In some embodiments, the communication element 803 (as with other components discussed herein) may be at least partially implemented as the processing circuitry 801 or otherwise controlled by the processing circuitry 801. In this regard, the communication element 803 may communicate with the processing circuitry 801, for example, through a bus. The communication element 803 may comprise, for example, antennas, transmitters, receivers, transceivers, network interface cards and/or supporting hardware and/or firmware/software, and is used for establishing communication with another apparatus. The communication element 803 may be configured to receive and/or transmit any data that may be stored by the memory 807 by using any protocol that can be used for communication between apparatuses. The communication element 803 may additionally or alternatively communicate with the memory 807, the input/output element 805 and/or any other component of the processing component 800, for example, through a bus.

In some embodiments, the processing component 800 may comprise an input/output element 805. The input/output element 805 may communicate with the processing circuitry 801 to receive instructions input by the user and/or to provide audible, visual, mechanical or other outputs to the user. Therefore, the input/output element 805 may comprise supporting devices, such as a keyboard, a mouse, a display, a touch screen display, and/or other input/output mechanisms. Alternatively, at least some aspects of the input/output element 805 may be implemented on a device used by the user to communicate with the processing component 800. The input/output element 805 may communicate with the memory 807, the communication element 803 and/or any other component, for example, through a bus. One or a plurality of input/output modules and/or other components may be included in the processing component 800.

Figure 9:
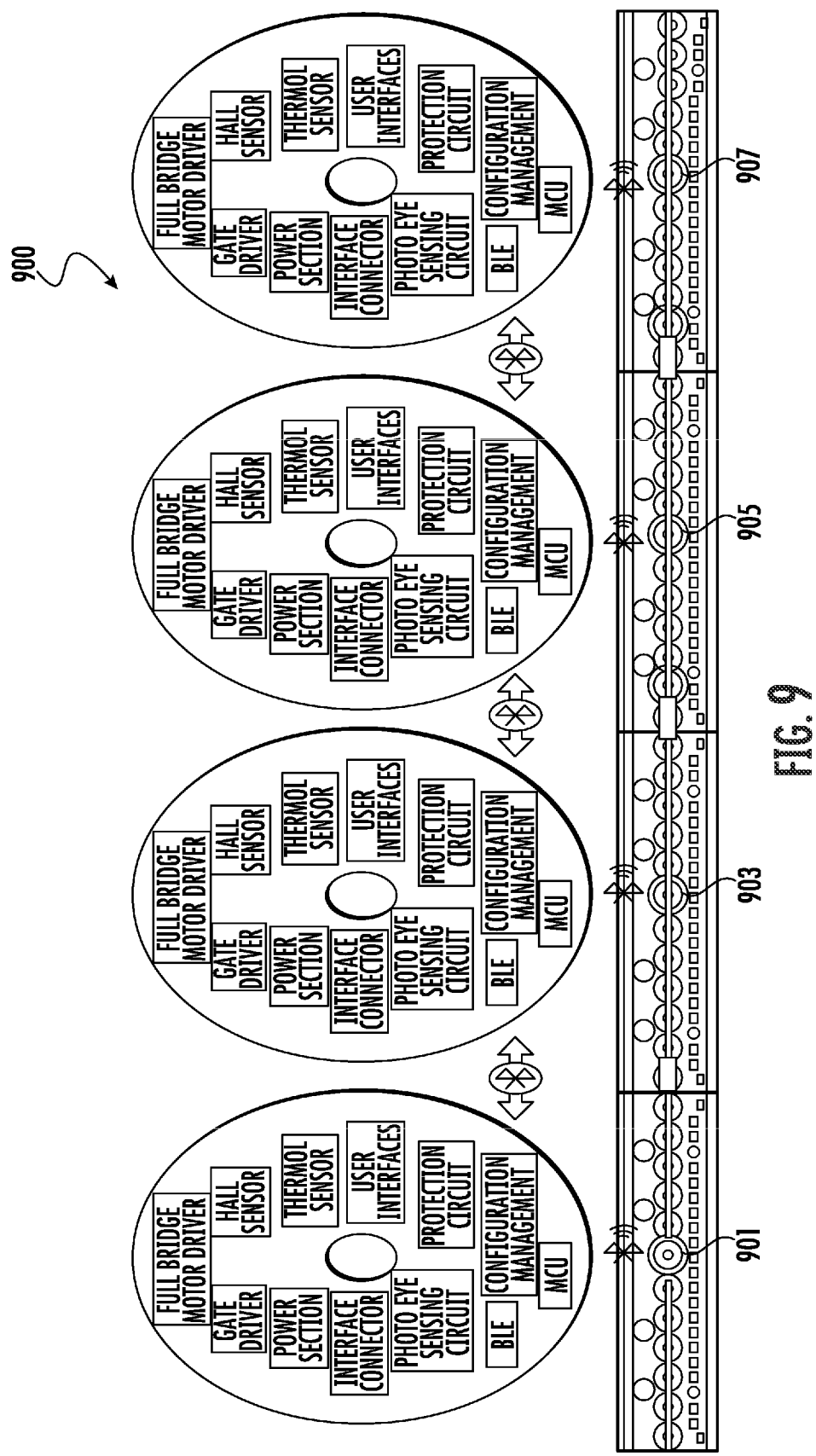
FIG. 9 illustrates an operational example of a system in accordance with various embodiments of the present disclosure.

Referring now to FIG. 9, a schematic diagram depicting an example conveyor assembly 900 in accordance with various embodiments of the present disclosure is provided. As depicted, the example conveyor assembly 900 comprises a plurality of selectively adjustable/configurable drive rollers, as described herein, in communication with one another. In particular, the conveyor assembly 900 comprises a first drive roller 901, a second drive roller 903, a third drive roller 905 and a fourth drive roller 907. In some embodiments, each of the first drive roller 901, the second drive roller 903, the third drive roller 905 and the fourth drive roller 907 may be operated according to a first operating condition wherein each drive roller is associated with a particular conveyor zone. Further, each of the first drive roller 901, the second drive roller 903, the third drive roller 905 and the fourth drive roller 907 may be selectively configurable (e.g., via control of the clutch-activated bearing elements thereof) for operation according to a second operating condition such that the respective plurality of idler rollers controlled by each of the drive rollers 901, 903, 905, 907 may define a dual-zone configuration associated with two conveyor zones that are operated by the corresponding drive roller independently of one another.

In various embodiments, each of the first drive roller 901, the second drive roller 903, the third drive roller 905 and the fourth drive roller 907 may be associated with a unique addressable identifier (e.g., machine readable code or string). Each unique addressable identifier may further be associated with (e.g., tagged with) a particular physical location of a conveyor system. As discussed herein, each of the first drive roller 901, the second drive roller 903, the third drive roller 905 and the fourth drive roller 907 may comprise a wireless module/component to enable wireless communication with one another and/or other computing entities. In some embodiments, each of the first drive roller 901, the second drive roller 903, the third drive roller 905 and the fourth drive roller 907 may be configured to be associated with a particular conveyor zone and/or operate as a master or slave with respect to the other drive rollers in the conveyor zone. In some embodiments, a plurality of integrated drive rollers (e.g., the first drive roller 901, the second drive roller 903, the third drive roller 905 and the fourth drive roller 907) may be configured in MESH network (e.g., as nodes within a local network) and may be configured to communicate with other drive rollers associated with other conveyor sections and/or conveyor zones.

Figure 10:
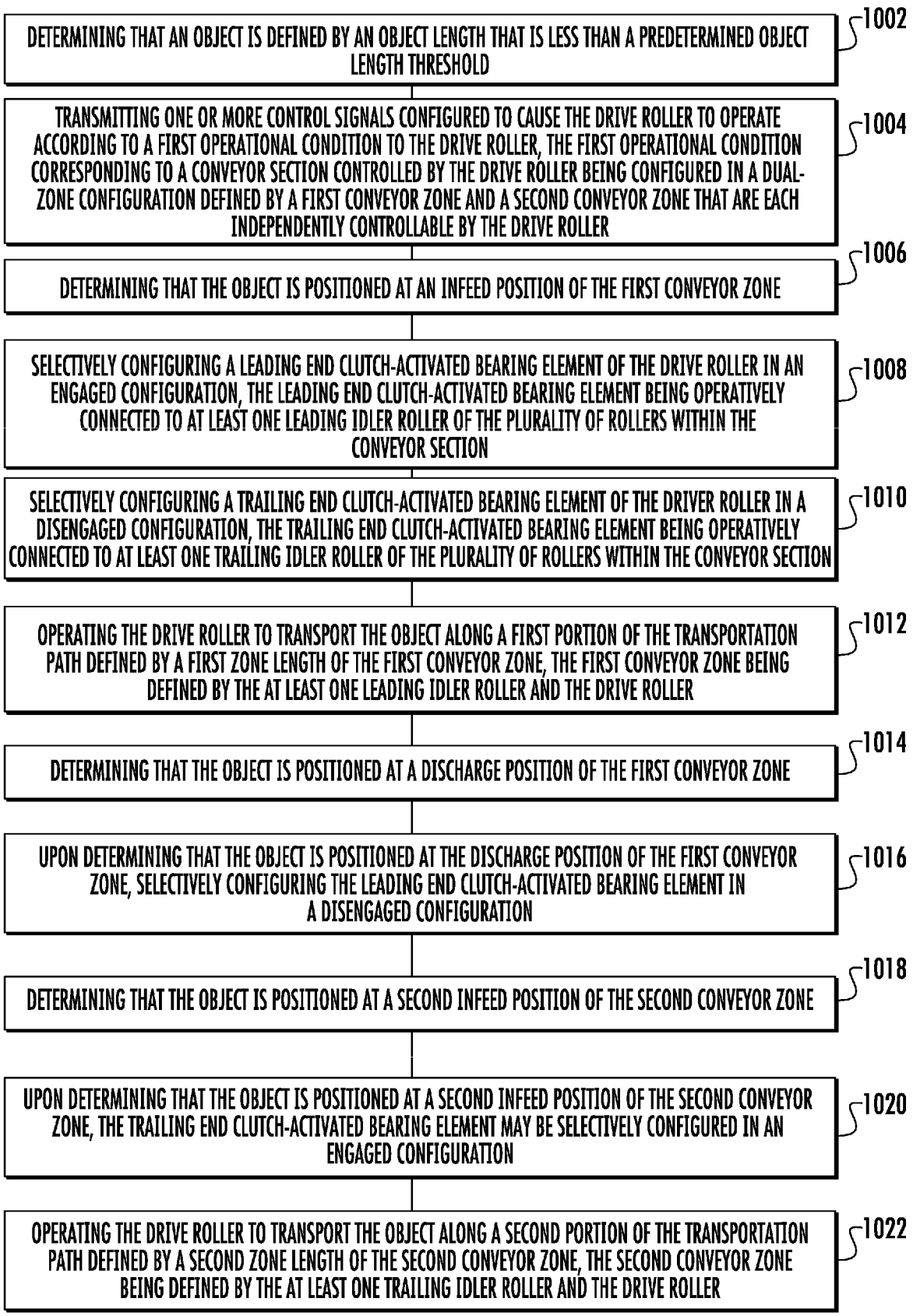
FIG. 10 is a flowchart diagram illustrating example operations in accordance with various embodiments of the present disclosure.
Figure 11:
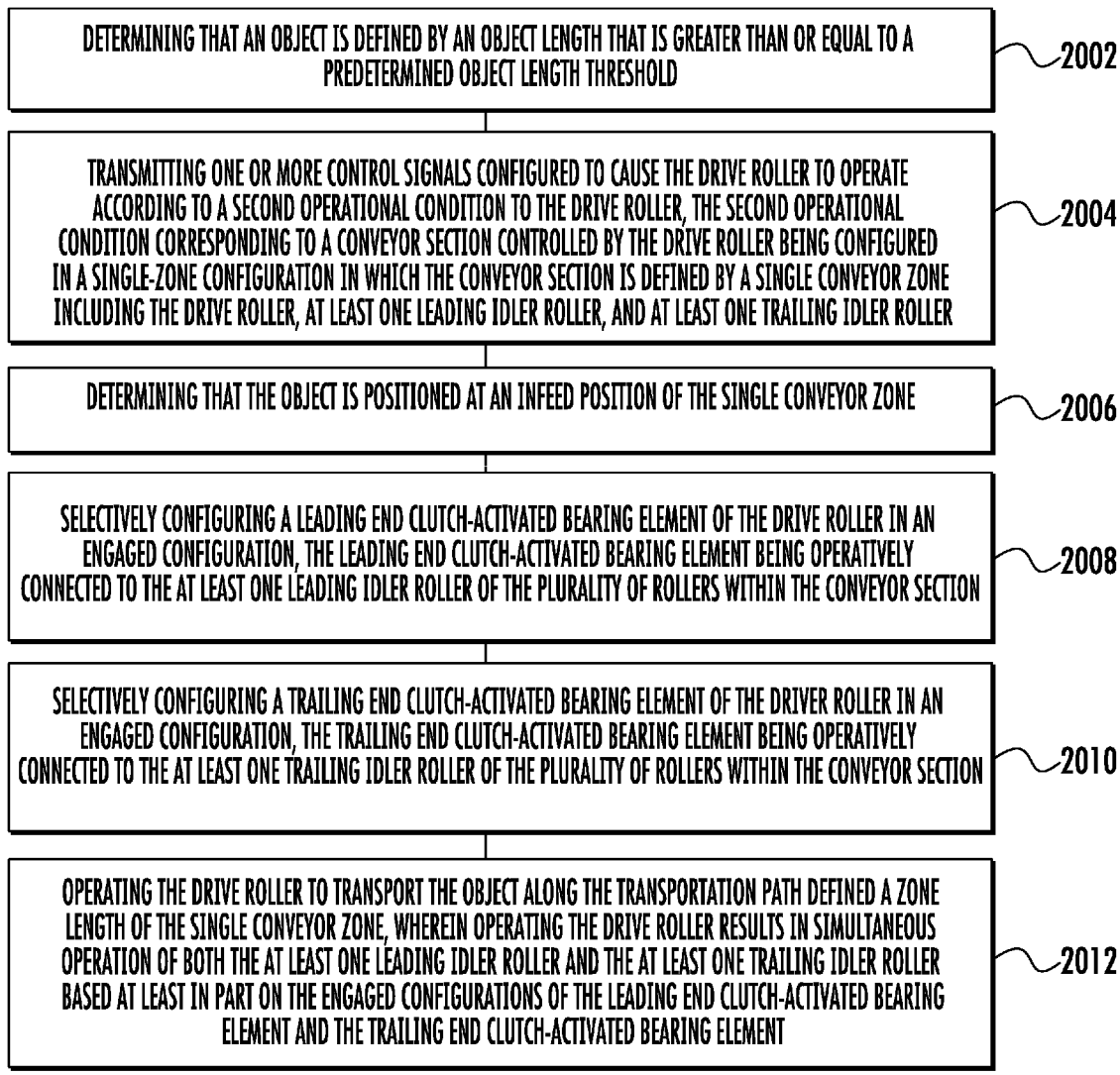
FIG. 11 is a flowchart diagram illustrating example operations in accordance with various embodiments of the present disclosure

Referring now to FIGS. 10 and 11, flowchart diagrams illustrating example operations 1000 and 2000 in accordance with various embodiments of the present disclosure are provided. In some examples, the methods 1000 and 2000 may be performed by various conveyor assembly components and/or conveyor system components (for example, but not limited to, processing circuitry of a computing entity 106 described above with regard to FIG. 1). The computing entity 106 may be or comprise a central server. In some examples, the processing circuitry may be electrically coupled to and/or in electronic communication with other circuitries, such as, but not limited to, one or more motor driven rollers (MDRs) (such as, for example, drive rollers 901, 903, 905 and 907 described above in connection with FIG. 9). For example, FIG. 10 illustrates an exemplary method of operating a conveyor assembly to transport an object along a transportation path, wherein the conveyor assembly comprises a plurality of rollers defining a conveyor section configured for transporting the object along the transportation path, the plurality of rollers comprising a drive roller configured to drive respective rotations of each of the plurality of rollers using a drive motor. In particular, FIG. 10 illustrates a method of transporting an object along a transportation path defined by a conveyor section by selectively configuring a drive roller controlling the plurality of rollers of the conveyor section such that the conveyor section defines a dual-zone configuration.

The example method 1000 begins at block 1002. At block 1002, an exemplary conveyor assembly may determine that an object is defined by an object length that is less than a predetermined object length threshold. At block 1004, one or more control signals configured to cause the drive roller to operate according to a first operational condition may be transmitted to the drive roller, the first operational condition corresponding to a conveyor section controlled by the drive roller being configured in a dual-zone configuration defined by a first conveyor zone and a second conveyor zone that are each independently controllable by the drive roller. At block 1006, the exemplary method 1000 may further include determining that the object is positioned at an infeed position of the first conveyor zone. At block 1008, a leading end clutch-activated bearing element of the drive roller may be selectively configured in an engaged configuration, the leading end clutch-activated bearing element being operatively connected to at least one leading idler roller of the plurality of rollers within the conveyor section. Further, at block 1010, a trailing end clutch-activated bearing element of the drive roller may be selectively configured in a disengaged configuration, the trailing end clutch-activated bearing element being operatively connected to at least one trailing idler roller of the plurality of rollers within the conveyor section. At block 1012, the drive roller may be operated to transport the object along a first portion of the transportation path defined by a first zone length of the first conveyor zone, the first conveyor zone being defined by the at least one leading idler roller and the drive roller. At block 1014, the method 1000 may further comprise determining that the object is positioned at a discharge position of the first conveyor zone. At block 1016, upon determining that the object is positioned at the discharge position of the first conveyor zone, the leading end clutch-activated bearing element may be selectively configured in a disengaged configuration. At block 1018, the method 1000 may further include determining that the object is positioned at a second infeed position of the second conveyor zone. Further, at block 1020, upon determining that the object is positioned at a second infeed position of the second conveyor zone, the trailing end clutch-activated bearing element may be selectively configured in an engaged configuration. At block 1022, the drive roller may be operated to transport the object along a second portion of the transportation path defined by a second zone length of the second conveyor zone, the second conveyor zone being defined by the at least one trailing idler roller and the drive roller.

FIG. 11 illustrates an exemplary method of operating a conveyor assembly to transport an object along a transportation path, wherein the conveyor assembly comprises a plurality of rollers defining a conveyor section configured for transporting the object along the transportation path, the plurality of rollers comprising a drive roller configured to drive respective rotations of each of the plurality of rollers using a drive motor. In particular, FIG. 11 illustrates a method of transporting an object along a transportation path defined by a conveyor section by selectively configuring a drive roller controlling the plurality of rollers of the conveyor section such that the conveyor section defines a single-zone configuration.

The example method 2000 begins at block 2002. At block 2002, an exemplary conveyor assembly may determine that an object is defined by an object length that is greater than or equal to a predetermined object length threshold. At block 2004, one or more control signals configured to cause the drive roller to operate according to a second operational condition may be transmitted to the drive roller, the second operational condition corresponding to a conveyor section controlled by the drive roller being configured in a single-zone configuration in which the conveyor section is defined by a single conveyor zone including the drive roller, at least one leading idler roller, and at least one trailing idler roller. At block 2006, the exemplary method 2000 may further include determining that the object is positioned at an infeed position of the single conveyor zone. At block 2008, a leading end clutch-activated bearing element of the drive roller may be selectively configured in an engaged configuration, the leading end clutch-activated bearing element being operatively connected to the at least one leading idler roller of the plurality of rollers within the conveyor section. Further, at block 2010, a trailing end clutch-activated bearing element of the drive roller may be selectively configured in an engaged configuration, the trailing end clutch-activated bearing element being operatively connected to the at least one trailing idler roller of the plurality of rollers within the conveyor section. At block 2012, the drive roller may be operated to transport the object along the transportation path defined a zone length of the single conveyor zone, wherein operating the drive roller results in simultaneous operation of both the at least one leading idler roller and the at least one trailing idler roller based at least in part on the engaged configurations of the leading end clutch-activated bearing element and the trailing end clutch-activated bearing element.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A conveyor assembly configured for transporting an object along a transportation path, the conveyor assembly comprising:

a plurality of rollers defining a conveyor section configured for transporting one or more objects disposed thereon along the transportation path, wherein the plurality of rollers comprises a drive roller configured to drive respective rotations of each of the plurality of rollers, and wherein the drive roller is selectively configurable between a first operating condition and a second operating condition; and a controller configured to generate one or more control signals configured to control the drive roller;

wherein the conveyor assembly is configured such that the conveyor section is selectively configurable between a single-zone configuration and a dual-zone configuration based at least in part on configuration of the drive roller in one of the first operating condition and the second operating condition; and wherein the dual-zone configuration is defined by the drive roller being configured to selectively drive operation of a first conveyor zone and a second conveyor zone defined within the conveyor section independently of one another, wherein the first conveyor zone is defined by a first portion of the plurality of rollers and the second conveyor zone is defined by a second portion of the plurality of rollers.

2. The conveyor assembly of claim 1, wherein the single-zone configuration is defined by the drive roller being configured to at least substantially simultaneously drive operation of a single conveyor zone within the conveyor section, wherein the single conveyor zone is defined by each of the plurality of rollers such that the single conveyor zone is defined by a full zone length; and wherein the dual-zone configuration is defined by the drive roller being configured to selectively drive operation of the first conveyor zone and the second conveyor zone defined within the conveyor section, the first conveyor zone and the second conveyor zone each being defined by a respective reduced zone length that is at least substantially less than the full zone length of the single conveyor zone.

3. The conveyor assembly of claim 1, further comprising an imaging device configured to capture object data associated with the one or more objects disposed upon the plurality of rollers, the imaging device being in communication with the controller; wherein the controller is configured to transmit one or more control signals to the drive roller based at least in part on the object data captured by the imaging device, wherein the one or more control signals are configured to cause the drive roller to be selectively configured according to one of the first operating condition and the second operating condition.

4. The conveyor assembly of claim 3, wherein the conveyor assembly is configured such that the drive roller being configured according to the first operating condition causes the conveyor section to define the single-zone configuration and the drive roller being configured according to the second operating condition causes the conveyor section to define the dual-zone configuration.

5. The conveyor assembly of claim 1, wherein the conveyor section is defined by the drive roller and a plurality of idler rollers operatively connected to the drive roller such that a rotation of each idler roller is based at least in part on one or more drive rotations of the drive roller, wherein the plurality of idler rollers comprises at least one leading idler roller and at least one trailing idler roller, the at least one leading idler roller defining an upstream position along the transportation path relative to the drive roller and the at least one trailing idler roller defining a downstream position along the transportation path relative to the drive roller.

6. The conveyor assembly of claim 5, wherein the single-zone configuration is defined by the drive roller being configured to at least substantially simultaneously drive operation of a single conveyor zone within the conveyor section, wherein the single conveyor zone is defined by each of the plurality of rollers such that the single-zone configuration of the conveyor section is defined by the drive roller being configured to at least substantially simultaneously operate the at least one leading idler roller and the at least one trailing idler roller.

7. The conveyor assembly of claim 5, wherein the dual-zone configuration of the conveyor section is defined by the drive roller being configured to operate the least one leading idler roller independently of the least one trailing idler roller such that the first conveyor zone is defined at least in part by the at least one leading idler rollers and the second conveyor zone is defined at least in part by the at least one trailing idler rollers.

8. The conveyor assembly of claim 7, wherein the drive roller is configured such that selective operation of the first portion of the plurality of rollers defining the first conveyor zone is defined by a first rotation of the drive roller and selective operation of the second portion of the plurality of rollers defining the second conveyor zone is defined by a second rotation of the drive roller, wherein the first rotation and the second rotation are in the same rotational direction relative to a central axis of the drive roller.

9. The conveyor assembly of claim 8, wherein a drive motor of the drive roller is operated to facilitate execution of both the first rotation and the second rotation.

10. The conveyor assembly of claim 1, wherein the drive roller is a motor driven roller (MDR).

11. The conveyor assembly of claim 1, wherein the one or more control signals generated by the controller comprise a first control signal comprising a drive signal configured to cause one or more rotations of the drive roller, and a second control signal comprising a configuration signal configured to cause the drive roller to be selectively configured in one of the first operating condition and the second operating condition.

12. The conveyor assembly of claim 1, wherein the drive roller comprises one or more clutch-activated bearing elements configured for engagement with a respective drive band to facilitate an operative connection between the drive roller and at least a portion of the plurality of rollers of the conveyor section; wherein the one or more clutch-activated bearing elements is selectively configurable between an engaged configuration and a disengaged configuration relative to a clutch element of the drive roller.

13. The conveyor assembly of claim 12, wherein the engaged configuration of a clutch-activated bearing element is defined by the clutch-activated bearing element being engaged by the clutch element such that a rotational position of the clutch-activated bearing element is fixed relative to a drive roller housing and the clutch-activated bearing element is rotated with the drive roller housing during operation of the drive roller; and wherein the disengaged configuration of the clutch-activated bearing element is defined by the clutch-activated bearing element being disengaged from the clutch element such that the rotational position of the clutch-activated bearing element is at least substantially unaffected as the drive roller housing rotates relative to the clutch-activated bearing element during operation of the drive roller.

14. The conveyor assembly of claim 13, wherein the one or more clutch-activated bearing elements comprise a first clutch-activated bearing element frictionally engaged with a first drive belt that is configured to operatively connect the drive roller to the first portion of the plurality of rollers, and a second clutch-activated bearing element frictionally engaged with a second drive belt that is configured to operatively connect the drive roller to the second portion of the plurality of rollers, wherein the first clutch-activated bearing element and the second clutch-activated bearing element are each independently configurable between respective engaged and disengaged configurations.

15. The conveyor assembly of claim 14, wherein the single-zone configuration of the conveyor section is defined by both the first clutch-activated bearing element and the second clutch-activated bearing element being selectively configured in an engaged configuration.

16. The conveyor assembly of claim 14, wherein the dual-zone configuration of the conveyor section is defined by a first one of the first clutch-activated bearing element and the second clutch-activated bearing element being selectively configured in an engaged configuration and a remaining one of the first clutch-activated bearing element and the second clutch-activated bearing element being selectively configured in a disengaged configuration.

17. The conveyor assembly of claim 1, wherein the one or more control signals generated by the controller correspond at least in part to object data associated with an object length of an object positioned along the transportation path.

18. The conveyor assembly of claim 17, wherein the conveyor assembly is configured to selectively configure the drive roller in the first operating condition corresponding to the conveyor section being in the single-zone configuration based upon a determination that the object length associated with the object is greater than or equal to a predetermined length threshold.

19. The conveyor assembly of claim 17, wherein the conveyor assembly is configured to selectively configure the drive roller in the second operating condition corresponding to the conveyor section being in the dual-zone configuration based upon a determination that the object length associated with the object is less than a predetermined length threshold.

20. A motorized drive roller for a conveyor apparatus, the drive roller comprising:
- a first clutch-activated bearing element configured to frictionally engage a first drive belt to facilitate an operative connection between the drive roller and at least one leading idler roller of a plurality of idler rollers configured to be controlled based on an operation of the drive roller;
- a second clutch-activated bearing element configured to frictionally engage a second drive belt to facilitate an operative connection between the drive roller and at least one leading trailing roller of the plurality of idler rollers;
- wherein the drive roller is configured to is selectively configurable between a first operating condition corresponding to the plurality of idler rollers collectively defining a single-zone configuration wherein each of the plurality of idler rollers are at least substantially simultaneously controlled by the drive roller and a second operating condition corresponding to the plurality of idler rollers collectively defining a dual-zone configuration wherein the at least one leading idler roller defines a first conveyor zone and the at least one trailing idler roller defines a second conveyor zone, the first and second conveyor zones being selectively controlled by the drive roller independent of one another; and
- wherein the second operating condition is defined by the first clutch-activated bearing element being selectively configured in an engaged configuration and the second clutch-activated bearing element being selectively configured in a disengaged configuration.

\* \* \* \* \*